United States Patent
Li et al.

(10) Patent No.: US 10,162,522 B1
(45) Date of Patent: Dec. 25, 2018

(54) ARCHITECTURE OF SINGLE CHANNEL MEMORY CONTROLLER TO SUPPORT HIGH BANDWIDTH MEMORY OF PSEUDO CHANNEL MODE OR LEGACY MODE

(71) Applicant: Cadence Design Systems, Inc., San Jose, CA (US)

(72) Inventors: Xiaofei Li, Beijing (CN); Zhehong Qian, Shanghai (CN); Yanjuan Zhan, Beijing (CN); Ying Li, Shanghai (CN); Buying Du, Beijing (CN)

(73) Assignee: Cadence Design Systems, Inc., San Jose, CA (US)

( * ) Notice: Subject to any disclaimer, the term of this patent is extended or adjusted under 35 U.S.C. 154(b) by 258 days.

(21) Appl. No.: 15/282,966

(22) Filed: Sep. 30, 2016

(51) Int. Cl.
*G06F 3/06* (2006.01)

(52) U.S. Cl.
CPC .......... *G06F 3/0604* (2013.01); *G06F 3/0631* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,450,587 A | 9/1995 | Salm | |
| 5,740,188 A * | 4/1998 | Olarig | G06F 11/1008 714/763 |
| 6,088,291 A * | 7/2000 | Fujioka | G11C 7/06 365/230.08 |
| 6,246,620 B1 * | 6/2001 | Fujioka | G11C 7/06 365/203 |
| 6,459,641 B2 * | 10/2002 | Fujioka | G11C 7/06 365/220 |
| 7,234,006 B2 | 6/2007 | Westrelin | |
| 7,379,329 B2 | 5/2008 | Prinz | |
| 8,024,553 B2 * | 9/2011 | Khailany | G06F 9/30014 712/225 |
| 8,122,078 B2 * | 2/2012 | Khailany | G06F 9/30014 708/603 |

(Continued)

OTHER PUBLICATIONS

Monitor Insider, "HBM2 Deep Dive", Feb. 13, 2016, pp. 1-9, https://web.archive.org/web/20160213171939/http://monitorinsider.conn/HBM.html (Year: 2016).*

(Continued)

*Primary Examiner* — Christopher D Birkhimer
(74) *Attorney, Agent, or Firm* — Vista IP Law Group, LLP

(57) ABSTRACT

Embodiments of the invention provide an approach to implement a single architecture to support high bandwidth memory of pseudo channel mode or legacy channel mode by using a single command channel and single data channel. An address mapping method forces each port transaction to alternatively split to two pseudo channels. Compared to the conventional pseudo channel architecture, the single architecture and pseudo channel rotation eliminates the need for duplicated command traffic logic, and a time division command arbitrator, which greatly reduces both control logic and power consumption of the circuits. Furthermore, pseudo channel rotation improves the utilization of memory bandwidth because the address mapping improves synchronization of the two pseudo channel traffics.

20 Claims, 24 Drawing Sheets

(56) References Cited

U.S. PATENT DOCUMENTS

| | | | | |
|---|---|---|---|---|
| 8,412,917 | B2* | 4/2013 | Khailany | G06F 9/30014 |
| | | | | 712/225 |
| 9,335,951 | B2* | 5/2016 | Son | G11C 11/4076 |
| 9,343,438 | B1* | 5/2016 | Lee | G11C 29/846 |
| 9,418,712 | B1* | 8/2016 | Erez | G06F 1/26 |
| 9,430,151 | B2* | 8/2016 | Fanning | G06F 12/1009 |
| 9,448,743 | B2* | 9/2016 | Prins | G06F 13/1657 |
| 2001/0021140 | A1* | 9/2001 | Fujioka | G11C 7/06 |
| | | | | 365/230.06 |
| 2008/0140994 | A1* | 6/2008 | Khailany | G06F 9/30014 |
| | | | | 712/205 |
| 2008/0307207 | A1* | 12/2008 | Khailany | G06F 9/30014 |
| | | | | 712/225 |
| 2010/0257329 | A1* | 10/2010 | Khailany | G06F 12/0879 |
| | | | | 711/163 |
| 2012/0011349 | A1* | 1/2012 | Khailany | G06F 9/30014 |
| | | | | 712/225 |
| 2016/0070474 | A1* | 3/2016 | Yu | G06F 3/0608 |
| | | | | 711/103 |
| 2016/0070499 | A1* | 3/2016 | Ly | G06F 3/0616 |
| | | | | 711/163 |
| 2016/0070662 | A1* | 3/2016 | Ly | G06F 3/0616 |
| | | | | 711/169 |
| 2016/0077751 | A1* | 3/2016 | Benedict | G06F 13/1626 |
| | | | | 711/105 |
| 2016/0110106 | A1* | 4/2016 | Fanning | G06F 12/1009 |
| | | | | 711/103 |
| 2016/0117118 | A1* | 4/2016 | Mart Nez | G06F 3/0611 |
| | | | | 711/162 |
| 2016/0188209 | A1* | 6/2016 | Hansson | G06F 13/16 |
| | | | | 711/118 |
| 2016/0202909 | A1* | 7/2016 | Nguyen Tien | G06F 3/061 |
| | | | | 711/103 |
| 2016/0202914 | A1* | 7/2016 | Hsu | G06F 3/0604 |
| | | | | 714/49 |
| 2016/0210052 | A1* | 7/2016 | Kanno | G06F 3/0604 |
| 2016/0224243 | A1* | 8/2016 | Son | G11C 11/4076 |
| 2016/0231962 | A1* | 8/2016 | Ware | G11C 7/1006 |
| 2016/0232112 | A1* | 8/2016 | Lee | G06F 13/1673 |
| 2016/0246515 | A1* | 8/2016 | Henriksson | G06F 9/5011 |

OTHER PUBLICATIONS

Mark Walton, "HBM3: Cheaper, Up to 64GB On-Package, and Terebytes-Per-Second Bandwidth", Aug. 23, 2016, pp. 1-4, https://arstechnica.com/gadgets/2016/08/hbm3-details-price-bandwidth/ (Year: 2016).*

Bruno Ferreira, "HBM3 and GDDR Emerge Fresh From the Oven of Hot Chips", Aug. 23, 2016, pp. 1-1, https://techreport.com/news/30559/hbnn3-and-gddr6-emerge-fresh-from-the-oven-of-hot-chips (Year: 2016).*

Joel Hruska, "Samsung Aims to Conquer the Memory Market With HBM3", Aug. 24, 2016, pp. 1-11, https://www.extremetech.com/gaming/234333-hbm-everywhere-samsung-wants-hbm3-low-cost-options-to-blow-the-doors-off-the-memory-market (Year: 2016).*

Anton Shilov, "JEDEC Publishes HBM2 Specifications As Samsung Begins Mass Production of Chips", Jan. 20, 2016, pp. 1-9, https://www.anandtech.com/show/9969/jedec-publishes-hbm2-specification (Year: 2016).*

Anthony Garreffa, "HBM3 Released by 2020, Offers More Bandwidth, Less Power", Aug. 25, 2016, pp. 1-3, https://www.tweaktown.com/news/53583/hbm3-released-2020-offers-more-bandwidth-less-power/index.html (Year: 2016).*

Cohen, Abey Abraham. "Addressing architecture for brain-like massively parallel computers." Digital System Design, 2004. DSD 2004. Euromicro Symposium on. IEEE, 2004.

Yuan, George L., Ali Bakhoda, and Tor M. Aarnodt. "Complexity effective memory access scheduling for many-core accelerator architectures." Microarchitecture, 2009. MICRO-42. 42nd Annual IEEE/ACM International Symposium on. IEEE, 2009.

Zou, Hui-Hui, et al. "The optimization and application of DDR controller based on multi-core system." Solid-State and Integrated Circuit Technology (ICSICT), 2012 IEEE 11th International Conference on. IEEE, 2012.

Wu, Jianping, Gang Ren, and Xing Li. "Source address validation: Architecture and protocol design." Network Protocols, 2007. ICNP 2007. IEEE International Conference on. IEEE, 2007.

* cited by examiner

Logic Start-Address from Port (30 bits): 1 1 0 0 0 1 1 0 0 1 1 0 0 1 1 1 0 0 1 1 0 1 0 1 0 0 0 0 0 0

ARCHITECTURE OF SINGLE CHANNEL MEMORY CONTROLLER TO SUPPORT HIGH BANDWIDTH MEMORY OF PSEUDO CHANNEL MODE OR LEGACY MODE

FIELD

This disclosure relates to the field of high-bandwidth memory systems.

BACKGROUND

Modern electronics rely heavily on memory because memory is central to a vast majority of computing operations. For example, running an application on a device, such as a cell phone, a table, personal computer or other device, will require the utilization of memory. This memory can be in the form of persistent storage such as solid state drives (SSDs), hard disk drives (HDDs) or even tape drives. However, persistent storage tends to be slower than non-persistent storage such as random access memory (RAM).

The high bandwidth memory dynamic random access memory (HBM DRAM) specification lists two modes of operation: legacy mode and pseudo channel mode. The two modes of operation depend on channel density and are fixed by the design of the memory array. In a conventional HBM DRAM system, a device can support either legacy mode or pseudo channel mode, but not both.

In legacy mode, each read or write transaction transfers 256 bit pre-fetch memory (2×128) bit in a burst that consists of 2 cycles of 128 bits each. In pseudo channel mode, the 128-bit bus is split into 2 individual 64-bit segments. On each segment, a read or write transaction transfers 256 bits as well, but in a burst that lastas 4 cycles (of 64 bits each).

The pseudo channel concept essentially divides the memory of a single channel in half and assigns each half to a fixed pseudo channel. Each read access or write access is internally executed as two seamless array accesses. Both pseudo channels operate semi-independent because they share the same address and command bus (e.g., you can send a command and address to one pseudo channel or the other, but not both) and the same CK and CKE inputs, but decode and execute commands individually. The pre-fetch as seen by the memory controller is therefore 256 bit per pseudo channel (2×128 bit).

The pseudo channel mode HBM has two independent sub channels, each having half the port data width size compared to the port data width of legacy mode. The two sub channel share a command pin and shares a low power/mode register setting, but have separated data pins. Most common conventional HBM controllers contain two read/write traffic channels to support pseudo channel mode. Therefore, each separate channel has the same command path and half width port data path as legacy mode to handle the traffic of each pseudo channel.

The conventional pseudo channel mode architecture has several shortcomings. First, the conventional pseudo channel mode architecture only supports pseudo channel mode and is not compatible to legacy mode because legacy mode only needs one command channel and 32 bytes port data width. Second, the two pseudo channel sub controllers cannot keep synchronous over a long period of time because the two ports are handled by different hosts which act independent of each other. To achieve the optimal system performance, the two ports should be accessed synchronously or with the same access length.

Furthermore, in conventional pseudo channel modes, the duplicated traffic channels contribute to more area, digital circuit control logic and power consumption. A drawback to the conventional pseudo-channel method is that while the port data path of each pseudo channel is half of that in legacy mode, the total data path costs the same hardware recourse as in legacy mode. Each pseudo channel needs an independent command control logic so the command path must be duplicated. This causes each pseudo channel to have separate port command buffers, command queue, and DDR PHY convertors.

As described above, pseudo channel mode needs to support two channels (e.g., two host ports), but legacy mode only needs one channel controller (e.g., one host port). Therefore, in conventional systems, HBM controllers must have two separate implementation architectures to support both legacy mode and pseudo channel mode separately. This method implements a single architecture to support both pseudo channel mode and legacy mode by using a single command channel to support pseudo channel mode will save die size and power consumption.

Therefore, there is a need for to use a single command channel and single data channel to support both pseudo channel mode and legacy mode in a single architecture.

SUMMARY

Embodiments of the invention provide using a single command channel and single data channel to support both pseudo channel mode and legacy mode in a single architecture. This method is based on pseudo channel (PS) rotation to automatically map user addresses to the DRAM memory in a contiguous block. The single architecture and pseudo channel rotation eliminates the need for duplicated command traffic logic, and a time division command arbitrator, which greatly reduces both control logic and power consumption of the circuits. Furthermore, pseudo channel rotation improves the utilization of memory bandwidth because the address mapping improves synchronization of the two pseudo channel traffics.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

FIGS. 6A-D illustrates an example operation of a write transaction from host to a legacy mode HBM DRAM according to some embodiments of the invention.

DETAILED DESCRIPTION

Figure 1:
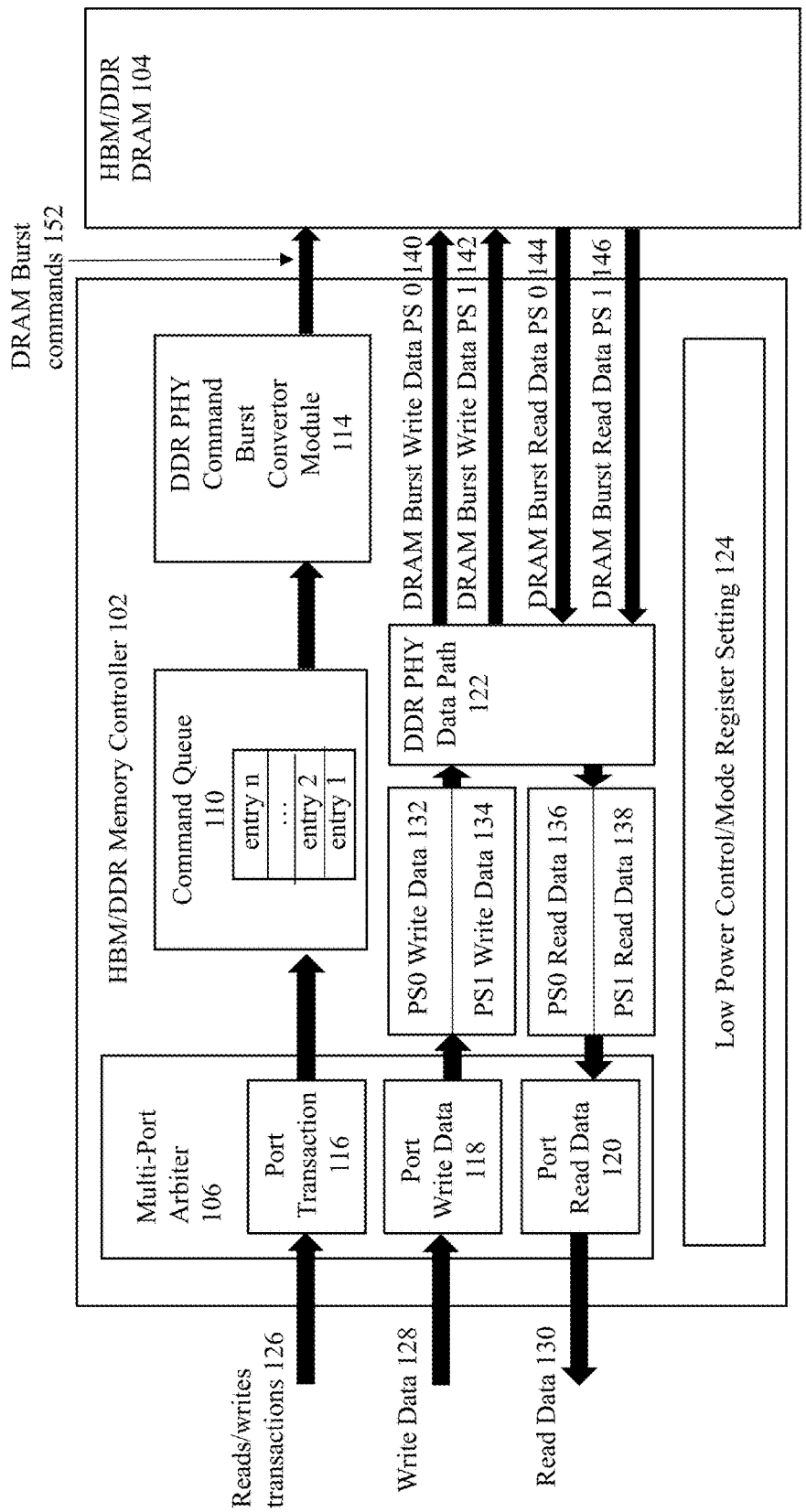
FIG. 1 illustrates an example system having a single architecture to support pseudo channel mode or legacy mode including a memory controller in which some embodiments of the invention may be implemented.

Various embodiments will now be described in detail with reference to the drawings, which are provided as illustrative examples of the invention so as to enable those skilled in the art to practice the invention. Notably, the figures and the examples are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

A traditional HBM/DDR memory controller accepts read and write transactions, re-arranges the schedule of these transactions, and transfers them to a burst splitting block. Then, the transactions are split and converted to DRAM bursts for the HBM/DDR DRAM memory interface. In addition, the HBM/DDR controller also carries the port data and memory data. The transactions received by the port contain the logic address and access length of the reads and writes. This allows the memory controller to transfer these logic addresses to memory physical address including a bank number, row number, column address, etc. The physical address is involved in the DRAM burst, which is finally sent to a memory interface.

HBM pseudo channel mode has two independent sub channels, each having half data width compared to the legacy mode. These two sub channels share the command pins and share low power/mode register settings, but have separated data pins.

The most common and traditional HBM controller supports pseudo channel mode by having two read and write traffic channels. Each of these channels has the same command path and half width data pin, as compared to legacy modes, to handle the traffic of each pseudo channel. The pseudo channel commands share the memory command pin, but occupies it in different time windows. A command arbitrator is needed to prevent the command issue time point from colliding between the two pseudo channels.

As previously mentioned, the conventional architecture for supporting pseudo channel modes has several shortcomings.

First, HBM bandwidth is not optimized because the pseudo channel sub controller cannot keep synchronous over a period of time due to having independent channel traffic. The command access to pseudo channel 1 can seamlessly follow the command to pseudo channel 0, but the command access to the same pseudo channel must be issued with a time interval. Typically, the read-to-read or write-to-write access to the same pseudo channel must be issued with an interval of 2 clock cycles (e.g., defined as $T_{ccd}$). However, the write and read from one pseudo channel to the other pseudo channel can be issued seamlessly. Therefore, to acquire the most bandwidth pseudo channel mode, the two pseudo channel should be accessed alternatively. The conventional architecture also requires two ports, which are handled by separate independent hosts. Thus, to acquire the optimal system performance the two ports should be accessed synchronously or with the same access length.

Second, the conventional architecture for pseudo channel mode can only support pseudo channel mode. The pseudo channel conventional architecture cannot be compatible with legacy mode because legacy mode only needs one command channel and is 32 bytes port data width.

Third, in conventional pseudo channel modes, the duplicated traffic channels contribute to more area, digital circuit control logic and power consumption. A drawback to the conventional pseudo-channel method is that while the port data path of each pseudo channel is half of that in legacy mode, the total data path costs the same hardware recourse as in legacy mode. Each pseudo channel needs an independent command control logic so the command path must be duplicated. This causes each pseudo channel to have separate port command buffers, command queue, and DDR PHY convertors.

FIG. 1 is a schematic diagram illustrating a system that may be employed in some embodiments of the invention to implement an architecture to support both pseudo channel mode and legacy mode. The improved system includes a single architecture uses a single command channel and single data channel to support both pseudo channel mode and legacy mode. In certain embodiments, a memory controller is coupled to the HBM DRAM device and may communicate with the HBM DRAM 104. The system includes a memory controller 102, which may be connected to one or more processing devices, and to a memory respectively for providing memory access.

Random access memory is electrically coupled to the memory physical interface. The memory could be any form of dynamic random-access memory (DRAM), however, the most common forms of DRAM are synchronous DRAM (SDRAM) such as double data rate (DDR) SDRAM and graphics double data rate (GDDR) SDRAM in various different speed grades. Most relevant here are DRMA memories that utilize the high bandwidth memory interface (HBM DRAM), through any memory with similar refresh requirements as DRAM could benefit from the inventive aspects as recited herein.

The HBM/DDR DRAM 104 is a memory chip that can support low power consumption, ultra-wide communication lanes, and stacked configurations. HBM defines two physically independent CA buses: Row command and Column command (C/R) bus and a control signal (CKE). The HBM DRAM 104 memory can receive HBM commands, data, data mask, parity, etc. Accordingly, each HBM device may have vendor-specific features, functions, and timings.

The memory controller 102 facilitates the access of a memory module in the computer system, where the memory module may include one or more memories. The memory controller 102 transmits a host of signals to the memory to access data from the memory or to send data to the memory. In one embodiment, the memory controller 102 communicates with the HBM DRAM 104 via signals including, but not limited to, a control signal, a clock signal, command signals, and any other signals to cause communication between the memory controller and the HBM DRAM 104.

The HBM/DDR Memory Controller 102 may comprise a Multi-Port Arbiter 106, Command Queue 110, DDR PHY Command Burst Convertor Module 114, DDR PHY Data Path 122, and Low Power Control/Mode Register Setting 124 to implement single architecture (e.g., in a Legacy Mode architecture) to support both Pseudo Channel Mode and Legacy Mode. Note that in the following drawings of the embodiments, signals are represented with lines. Some lines may have arrows at one end to indicate the primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In some embodiments, a Multi-Port Arbiter 106 communicates with the host (e.g., CPU, GPU, DMA, etc). The Multi-Port Arbiter 106 provides a configurable, multi-port bandwidth for the allocation for optimal memory access by on-chip processing units. The port is an open-standard, on-chip interconnect specification for the connection and management of functional blocks in system-on-a-chip designs. In some embodiment, the Multi-Port Arbiter 106 includes a Port Transaction 116 to read and write transactions 126, a Port Write Data 118 to write data 128, and a Port Read Data 120 to read data 130. The transactions received in the ports contain the logic address and access length of the read/writes.

In some embodiments, a Command Queue 110 may be included as illustrated. The Command Queue 110 unit transfers logic address to memory physical address. In some embodiments, a Command Queue 110 re-arranges the order of received transactions and select them out by specific rules to acquire the optimal traffic efficiency.

For the sake of clarity, the operation of the command queue is briefly covered here. First, the entries in the command queue provide a single entry that specifies an access operation (e.g., read or write). As a result, the command queue provides a structure to store data issues an access command while maintaining a timing/ordering relationship between the two commands.

The DDR PHY Command Burst Convertor Module 114 receives one or more transactions from the Command Queue 110 to reduce the long transactions to a number of short memory bursts. The burst length is based on the memory setting. On the host side, all the data or signal in digital circuits are sampled in single clock edge, but on the DDR DRAM interface, only double clock edged data or address signals are supported. Therefore, the controller converts single clock edged signal to double clocked signal in the DDR PHY Command Burst Convertor Module 114 and DDR PHY Data Path 122.

Figure 2:
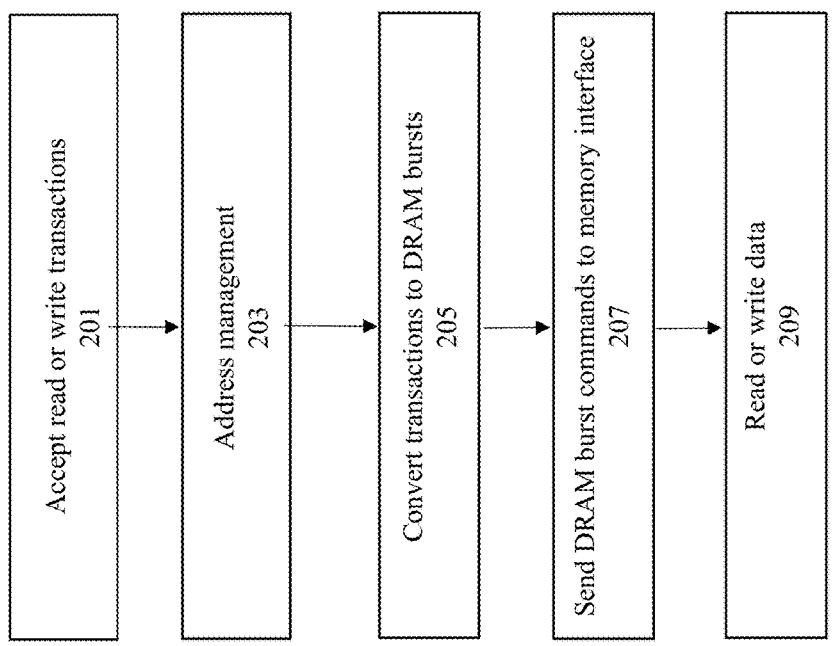
FIG. 2 illustrates a process flow according to some embodiments of the invention.

FIG. 2 shows a flowchart of an approach to use a single command channel and single data channel to support both pseudo channel mode and legacy mode. The operations shown in FIG. 2 may be performed at least by the HBM/DDR Memory Controller 102, which controls the operations performed on the HBM/DDR DRAM 104.

First, the HBM/DDR Memory Controller 102 accepts read transactions or write transactions from the Multi-Port Arbiter 106 at 201. The read/write commands may be generated as a result of one or more processing elements as is known in the art. For instance, a processing element might request a particular piece of data from a local cache, which in turn may generate a corresponding command to the memory controller when the particular piece of data is not found within the cache. Furthermore, the processor might know what data it expects to read/write or otherwise access next, and what data was recently accessed.

Next, address management is used to transfer logic address to memory physical address. The command address queue re-arranges the order of received transactions at 203. There are many ways to perform scheduling. For instance, scheduling may be performed using score boarding, a queue may be populated in a specific order, specific ports or registers may be used corresponding to the number of possible commands that may be active during the same overall time period, or data structures, such as the read/write queue, may be populated with additional data to order the commands, any of which or some combination thereof may be appropriate here.

The HBM/DDR Memory Controller 102 then splits the transactions and converts the split transactions to DRAM bursts at 205. In addition, the HBM/DDR Memory Controller 102 will carry the port data and memory data. The transactions received in the ports contain the logic address and access length of the read and writes. The Memory Controller 102 will transfer these logic addresses to memory physical address including bank number, row number, column address, etc. The physical address is involved in the DRAM burst commands 152 that are sent to the memory interface at 207. Finally, the Memory Controller 102 will execute the DRAM burst commands 152 to read or write the data to memory at 209.

Figure 3:
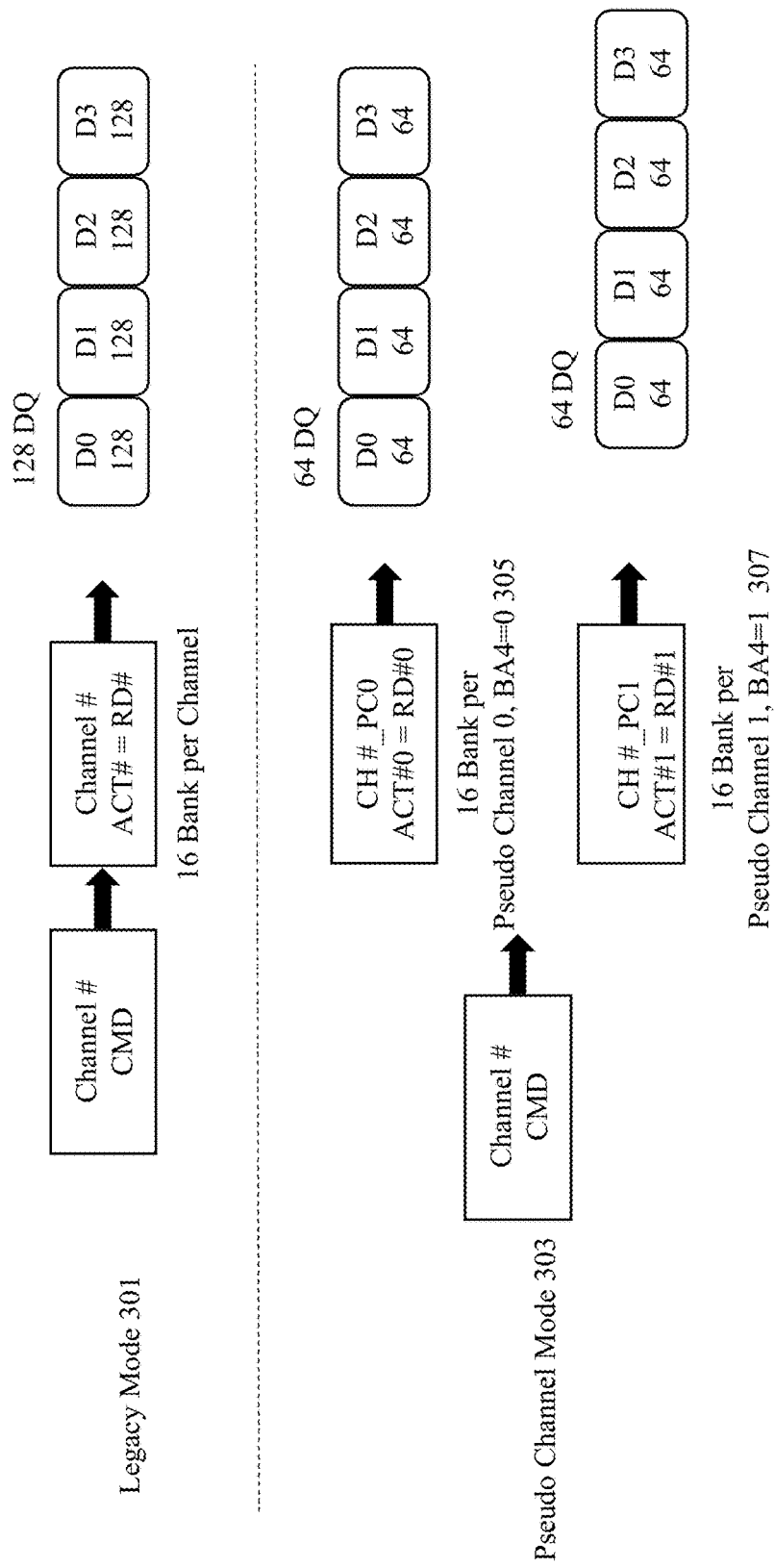
FIG. 3 illustrates a comparison between the legacy operation mode and pseudo channel operation mode.

FIG. 3 illustrates a comparison between legacy mode operations and pseudo channel operations. Legacy Mode 301 provides 256-bit pre-fetch per memory for each read and write access.

In Pseudo Channel (PS) Mode 303, the 128-bit bus is split into 2 individual 64-bit segments. Each pseudo channel shares the same address and command bus, but has separated banks and independent 64 bit I/Os. On each segment, a read or write transaction transfers 256 bits as well, but in a burst that lasts 4 cycles (of 64 bits each). The pseudo channel mode requires that each read or write access is internally executed as two seamless array accesses. Thus, the pre-fetch as seen by the memory controller is 256 bit (4×64 bits) per pseudo channel.

Both pseudo channels operate semi-independently. They both share the channel's row and column command bus as well as CK and CKE inputs. However, the channels decode and execute the commands individually. Address BA4 is used to direct commands to either Pseudo Channel 0 (PS0, BA4=0) 305 or Pseudo Channel 1 (PS 1, BA4=1) 307. Power-down and self-refresh are common to both pseudo channels due to the shared CKE pin.

Figure 4:
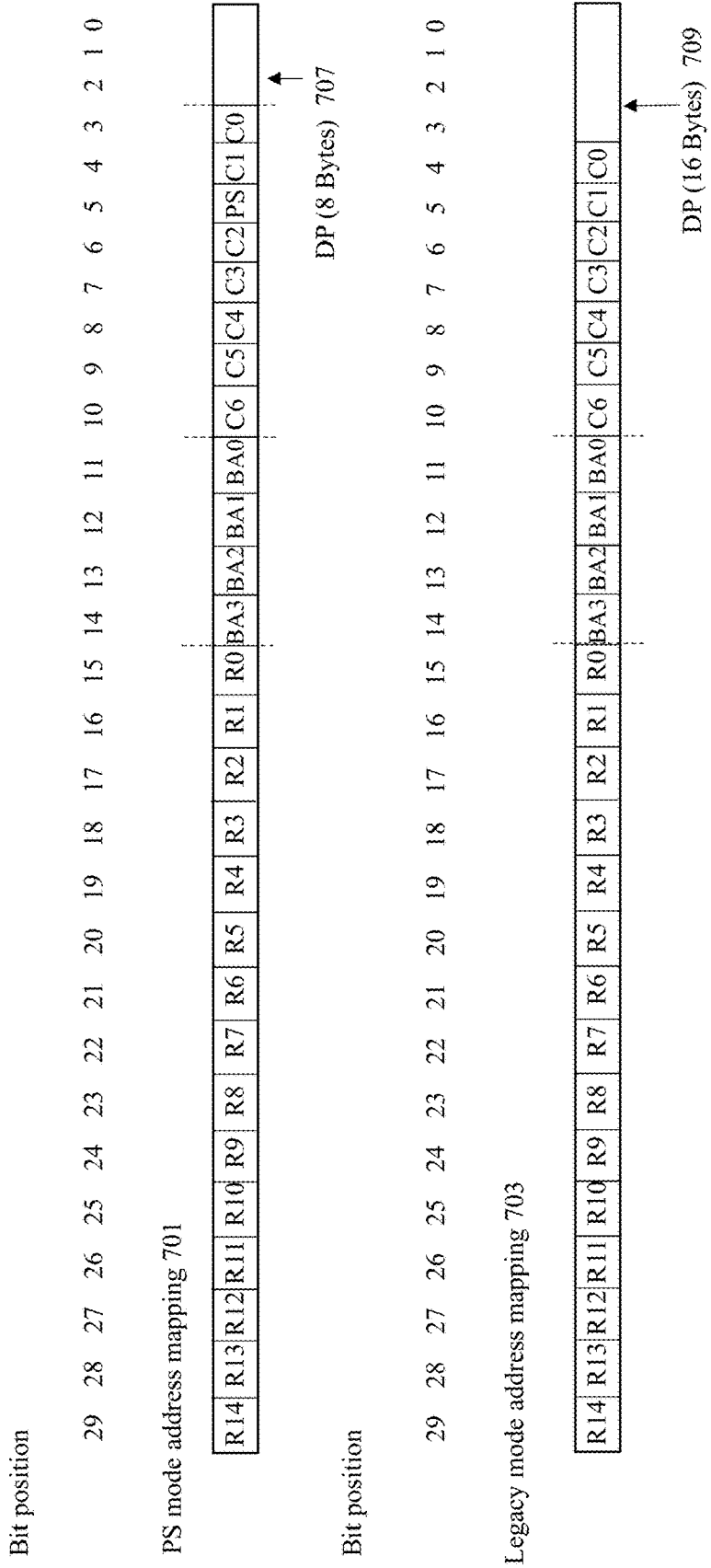
FIG. 4 illustrates an address mapping method according to some embodiments of the invention.

FIG. 4 illustrates an address mapping method to reconfigure a module address management for pseudo channel mode and legacy channel mode compatibility. Under this method, the two pseudo channels transactions are forced to sync and issued alternatively. In some embodiments, this address mapping method is implemented by a bank group rotation.

To acquire the most bandwidth on the HBM memory interface, the two pseudo channel access should rotate alternatively (e.g., PS0→PS1→PS0→PS1 ... ). Bank group rotation works by alternating the banks, which are accessed for a particular command. The basic unit of this type of access is two pseudo channel's BL4, pseudo channel 0 burst length 4 access plus another burst length 4 access of pseudo channel 1. For example, a burst length of 4 might access pseudo channel 0, then pseudo channel 1, pseudo channel 0, etc. This improves performance because after each individual bank is accessed there is a required delay before that same bank can be accessed again. Therefore, when bank accesses alternate more useful work can be performed while waiting for the required delay period for the other bank and vice versa.

The range of this access is 64 bytes total, which is the same length of BL4 in legacy mode HBM. Therefore, the 64 bytes host data can be forced to split to access two pseudo channels in pseudo channel mode HBM, and be used as an entirety of BL4 in legacy mode HBM. The address mapping method in the address management module may be as follows: R represents row, BA represents bank, C represents column, PS represents pseudo channel, DP represents the bit/byte width in each column unit. The DP of pseudo channel mode 707 is half width of legacy mode 709. In some embodiments, the address mapping method can be re-configured in the module address management module to be compatible for both pseudo channel mode or legacy mode.

Another advantage to using this address mapping method is that the host does not need to indicate the PS address to the HBM controller. Each host transaction will be split to access two pseudo channel. Therefore, only one port is needed. Similarly, each port data should also be split to two pseudo channels. The port data width has a total size of burst 4 size of two pseudo channel (e.g., 32 bytes). This is the same as the port data width of legacy mode. Therefore, the new architecture can be compatible to support legacy mode as well. The pseudo-channel mode 701 and legacy mode 703 switching can be set through a re-configuration interface.

FIGS. 5A-5E illustrates diagrams showing components to implement a single architecture to support pseudo-channel mode or legacy mode. Here, the interactions between the components and how they communicate with each other are shown.

Figure 5A:
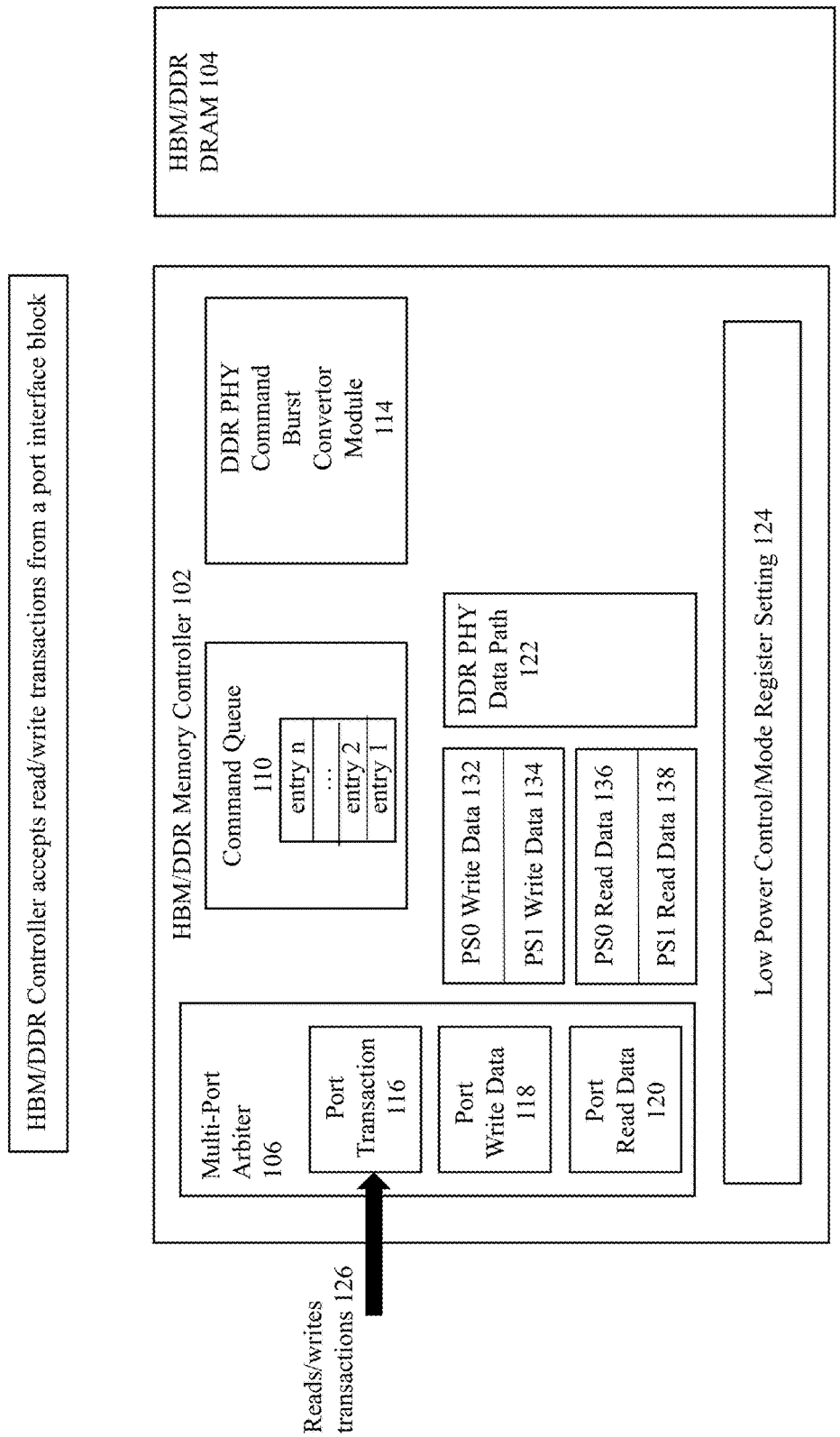
FIG. 5A-E show diagrams illustrating an example architecture for using single command channel and single data channel to support pseudo channel mode or legacy mode for a write or read transaction according to some embodiments of the invention.

FIG. 5A illustrates a HBM/DDR Memory Controller 102 accepting read transactions or write transactions from a port interface block. Specifically, the Port Transaction 116 accepts the read transactions or write transactions 126 according to methods known in the art.

Figure 5B:
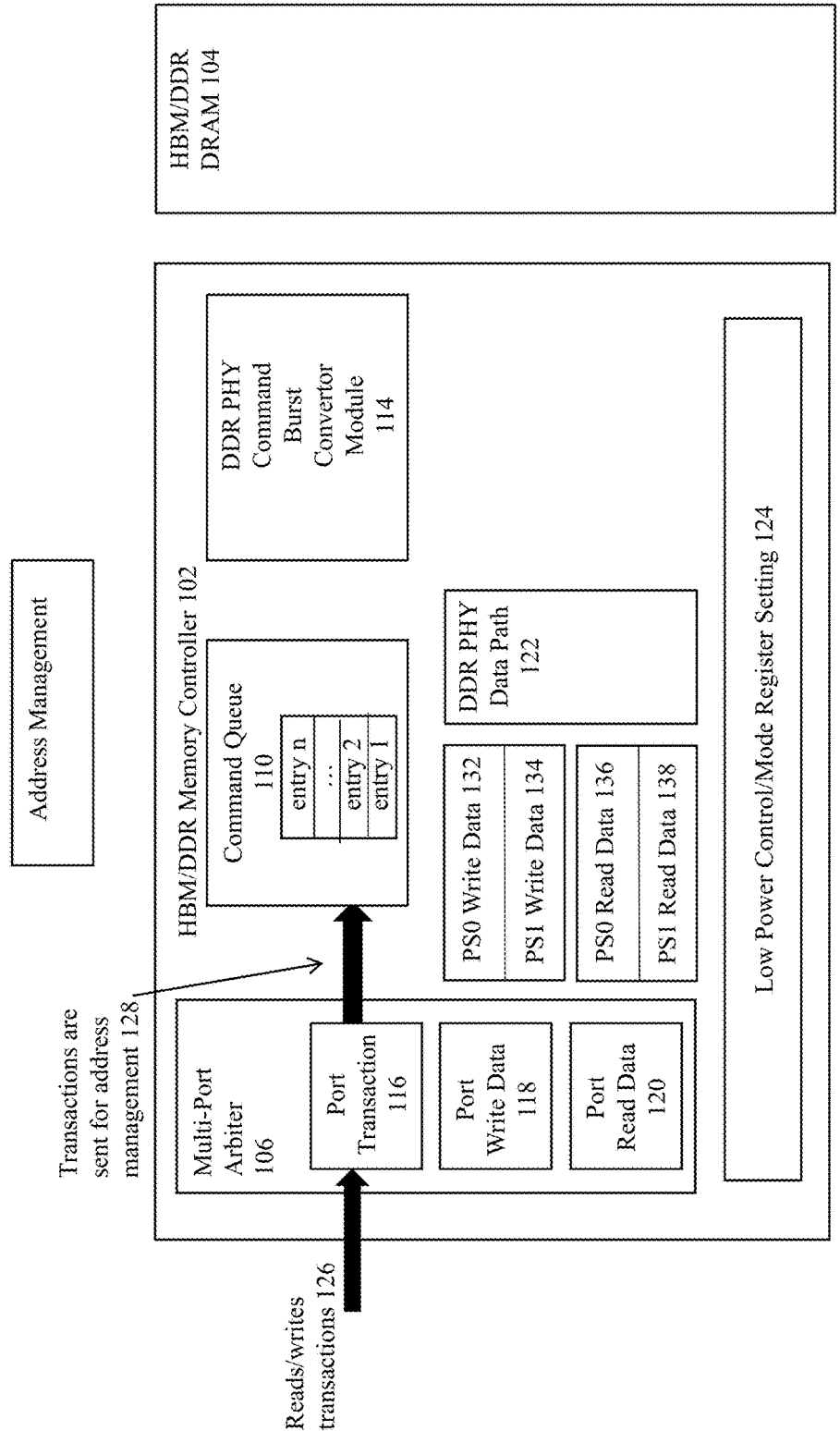

FIG. 5B illustrates the address management of the read or write transaction. The Command Queue 110 performs an address management to transfer logic address to memory physical address. The Command Queue 110 receives the transactions 128 from the Multi-Port Arbiter 106 to re-arrange the schedule of these transactions and selects them by specific rules to acquire the optimal traffic efficiency.

The command queue 110 provides the structure necessary to track the pending commands. The command queue 110 contains storage for a number of entries, where each entry may correspond to both a bank refresh and a memory read operation or a memory write operation. In some embodiments, the memory controller or the command queue may receive one or more transactions and translate these transactions into one or more memory access commands.

Figure 5C:
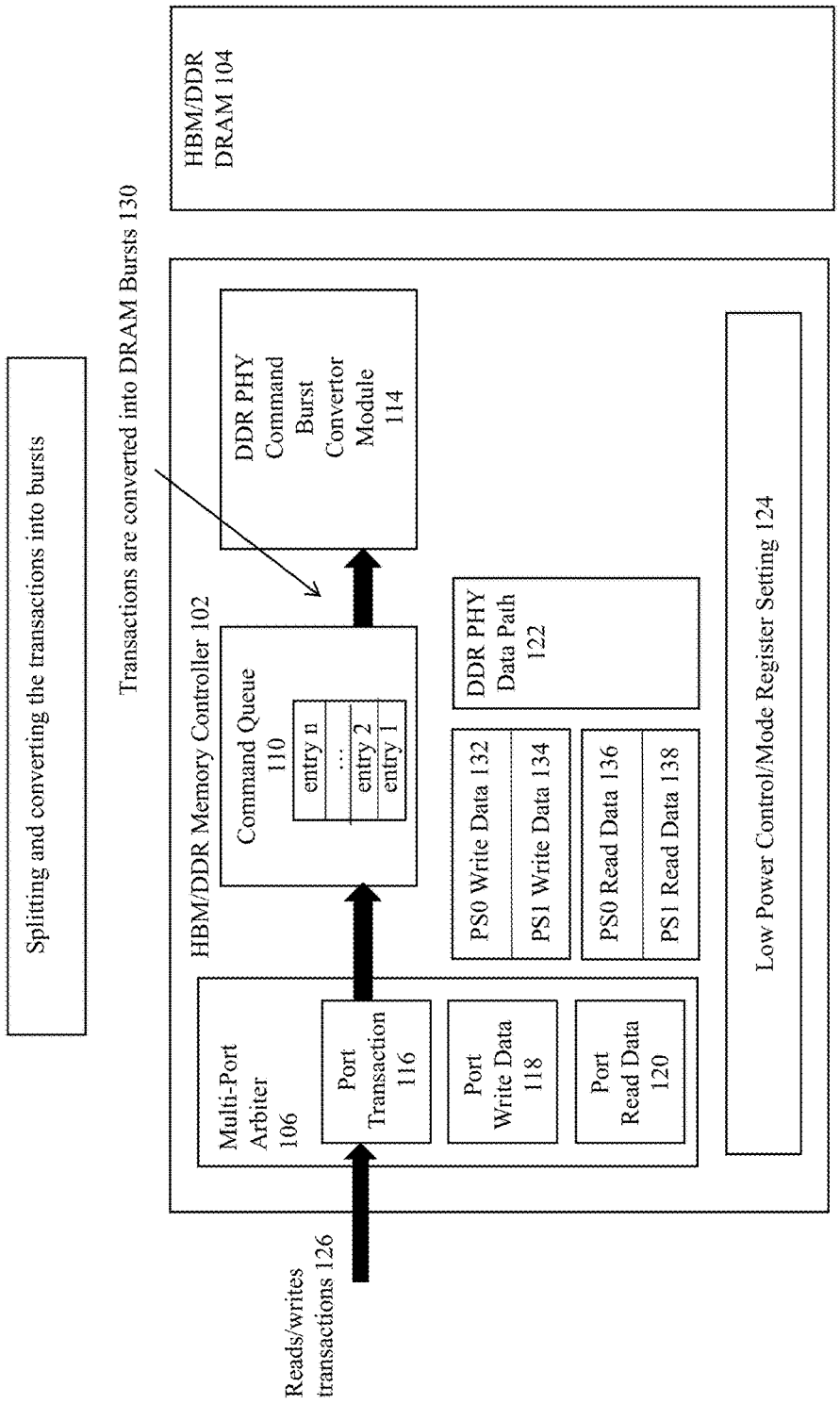

FIG. 5C illustrates splitting and converting the transactions into DRAM bursts. The DDR PHY Commend Burst Convertor Module 114 splits the transactions to a number of short memory bursts 130. The burst length is based on the memory setting. The HBM DRAM 104 has $2^4$ banks, each bank has $2^{15}$ rows, where each row has $2^7$ column cells and each column cell contains $2^4$ bytes. The total size of the DRAM is $2^{30}$. A logic address signal of 30 bits width can cover this range. The logic address will be separately split to bank address, row address and column address according to each physical unit size of the HBM DRAM 104. The minimum access range is according to the setting of memory burst length× column cell. For example, if burst length is 4 (BL4), 4×column cell will be accessed each time. The transaction splitting module will cut the long transactions to short access with the same length of 4×column cell.

Figure 5D:
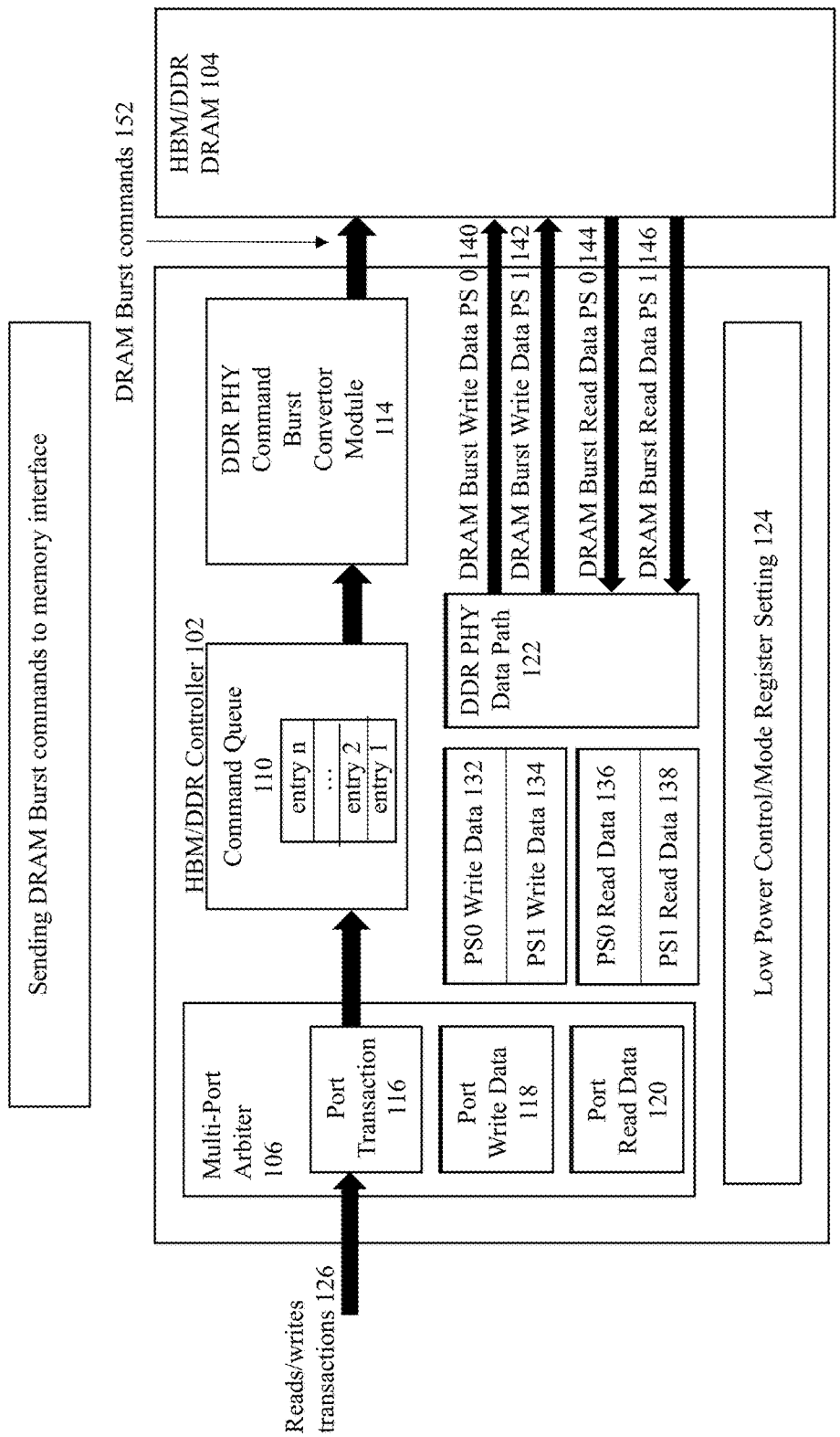

FIG. 5D illustrates the Memory Controller sending DRAM Burst commands 152 to the memory interface. In the host side, all the data or signal in digital circuits are sampled in single clock edge, but on the DRAM interface, only double clock edged data or signals are supported. The DRAM memory interface uses double clock edges to transfer the single clock edged data from the host side because the host data width in the port is twice of the memory data width. The HBM memory data width is 128 bits ($2^4$ bytes) so the port data width is $2^5$ bytes. Therefore, the controller needs to convert single clock edged signal to double clocked signal 133 in the DDR PHY command Burst Convertor module and the DDR PHY data path. If it is a read transaction, the DDR PHY Data Path 122 will read DRAM Burst Read Data PS0 144 and/or DRAM Burst Read Data PS1 146. If it is a write transaction, the DDR PHY Data Path 1122 will write DRAM Burst Write Data PS0 140 and/or DRAM Burst Write Data PS1 142.

Figure 5E:
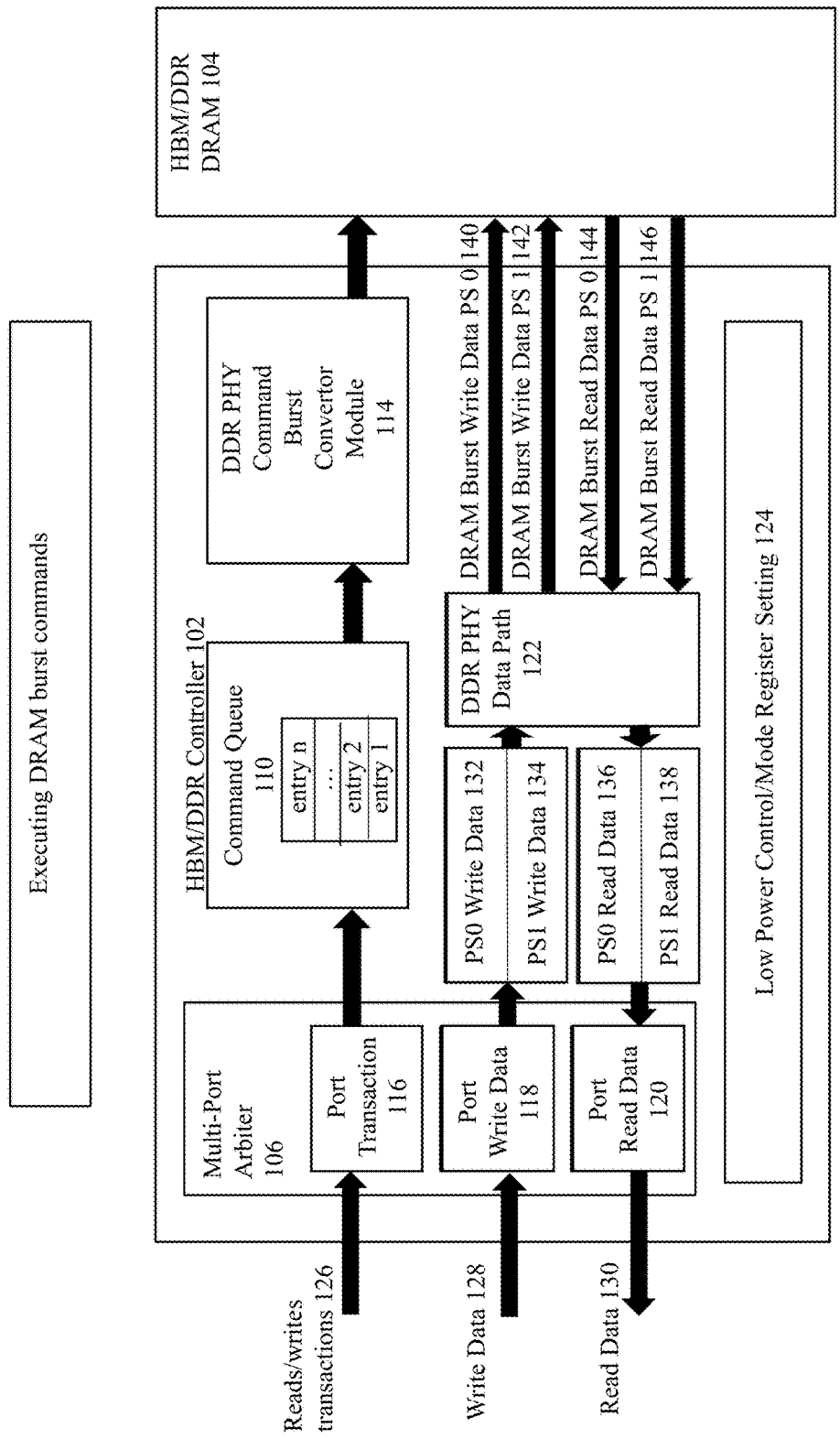

FIG. 5E illustrates the HBM/DDR Controller executing the burst commands to either read data to the memory or write data to the memory. If it is a read transaction, the DDR PHY Data Path 112 will send PS0 Read Data 136 and/or PS1 Read Data 138 to the Port Read Data 120 to write data 128. If it is a write transaction, the DDR PHY Data Path 112 will send PS0 Write Data 132 and/or PS1 Write Data 134 to the Port Write Data 118 to write data 128.

In this new address mapping method, the host does not need to indicate the PS address to the HBM controller. Each host transaction will be split to access two pseudo channel by the HBM/DDR Controller so only one port interface is needed. Similarly, each port data should also be forced to split to two pseudo channels so the port data width is total size of burst 4 size of the two pseudo channel, 32 bytes. This is the same as the port data width of legacy mode. Therefore, the new architecture can be easily compatible to support legacy mode. The pseudo channel and legacy mode switching can also be set through a reconfiguration interface.

The architecture seen in FIG. 1 and FIGS. 5A-5E uses a single command channel and single data channel to support both PS mode and legacy mode. Compared to the conventional architecture, there is no duplicated command traffic logic in this architecture and no time division command arbitrator. This reduces the control logic and power consumption of the circuit.

FIGS. 6A-6D illustrates an example of a write transaction from host side to legacy mode. The write transaction is transferred through a controller to a legacy mode HBM DRAM interface.

FIG. 6A illustrates an example of a write transaction. The write transaction from the AMBDA bus contains a start binary address of 11-0001-1000-1110-1001-1010-0100-000 601 with an access length of 12×16 bytes.

Figure 6B:
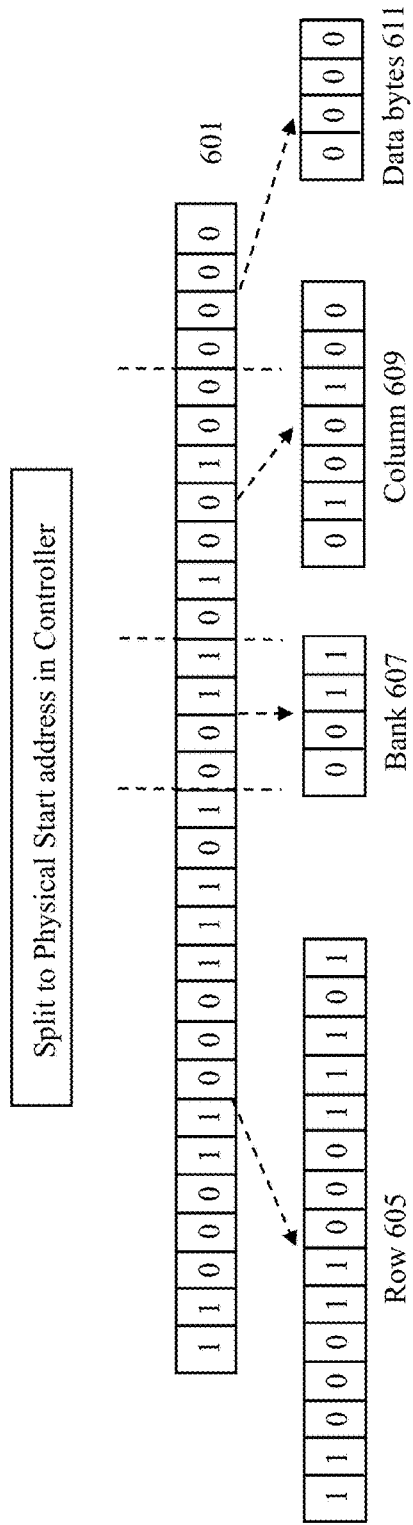

FIG. 6B illustrates splitting to physical start address in the controller. The address order in module address management is row-bank-column-databytes. The logic address will be split to (11-0001-1000-1110-1) row 605, (0011) bank 607, (010-0100) column 609, and (0000) data bytes 611 with 4 bits for each column data path (DP) 611, 7 bits for column 609, 4 bits for bank 607, and 15 bits for row 605. Thus, the DRAM physical start address will be bank 0x3, row 0x631D, column 0x24, and 0x0 data bytes.

Figure 6C:
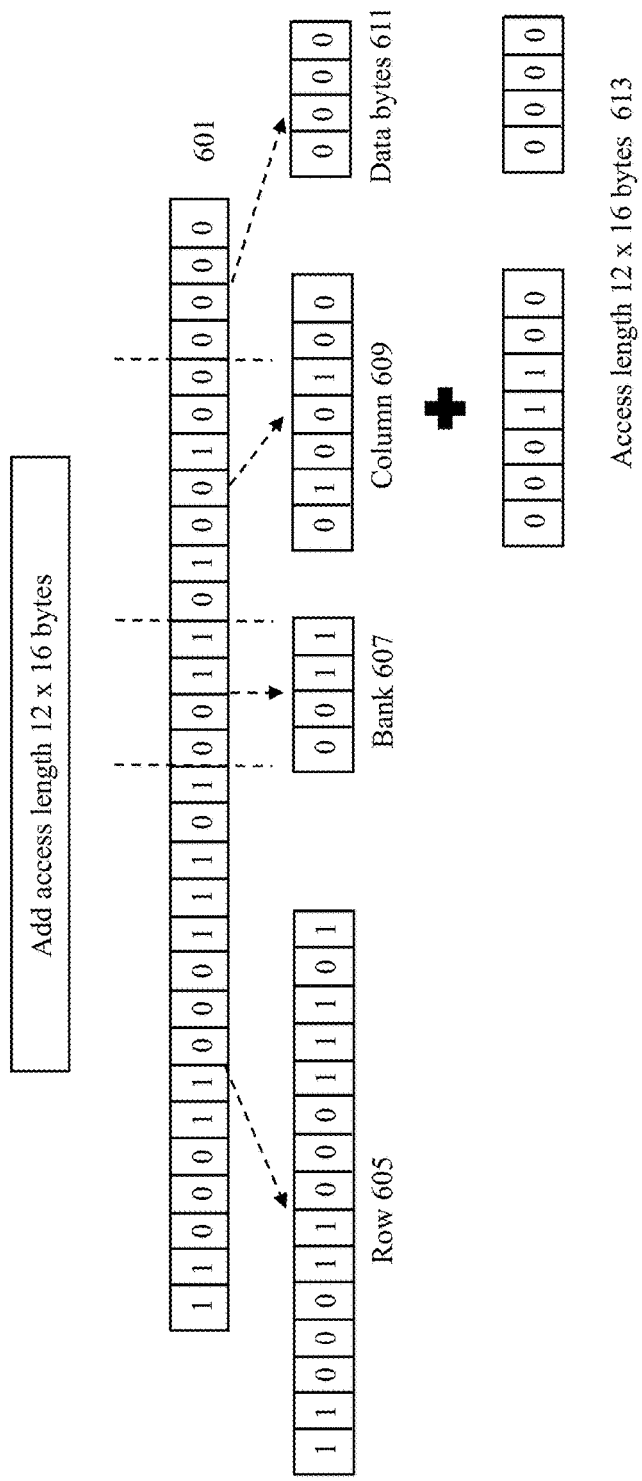

FIG. 6C illustrates adding access length of 12×16 bytes. The access length is 12x16 bytes 611 so the access end physical address should be the same bank 0x3, the same row 0x631D, the column is 0x24+12=0x30, and the same data bytes.

Figure 6D:
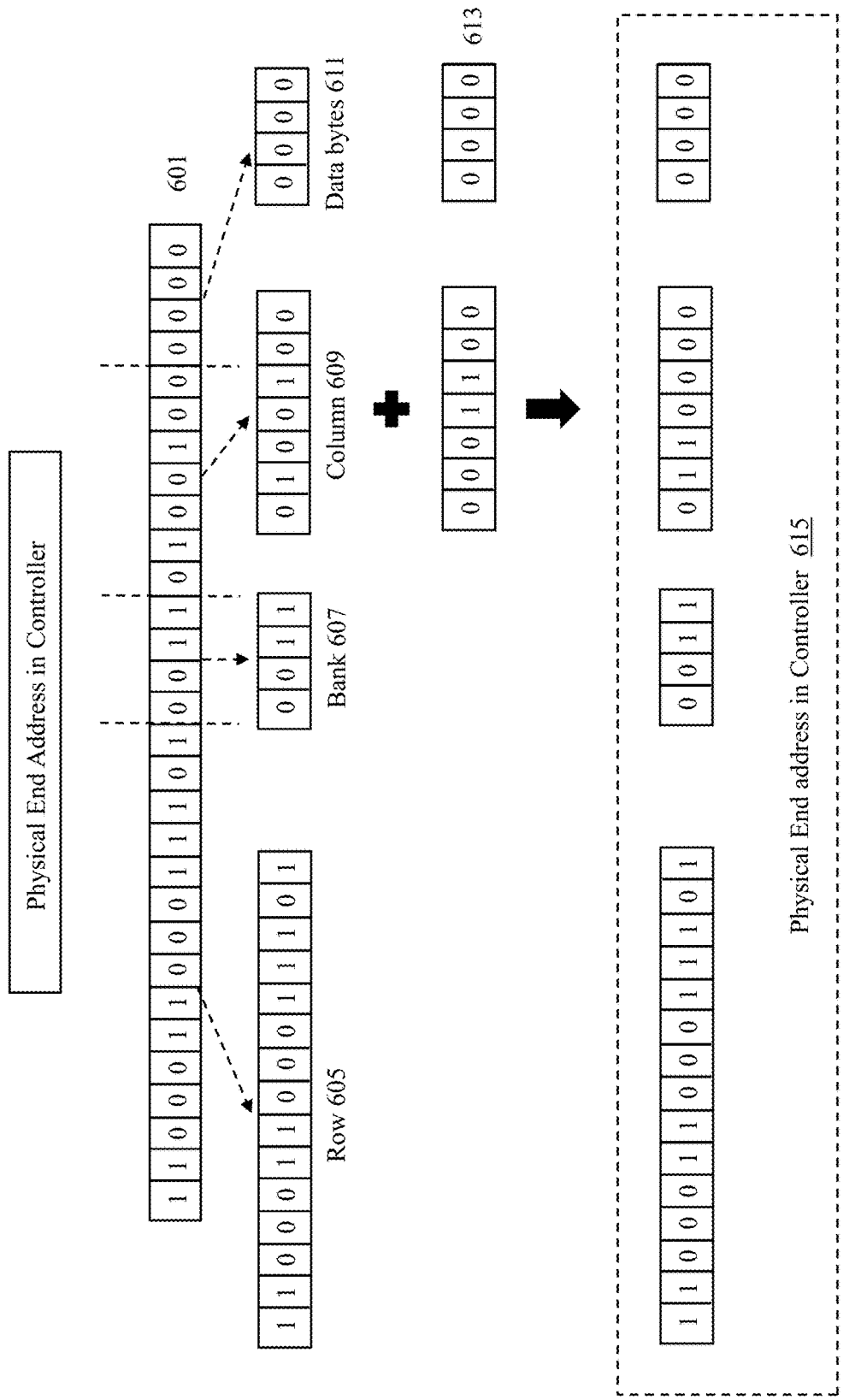

FIG. 6D illustrates the physical end address in controller. The access length 12×16 bytes is added to the split physical start address to receive the physical end address in controller 615.

Figure 7:
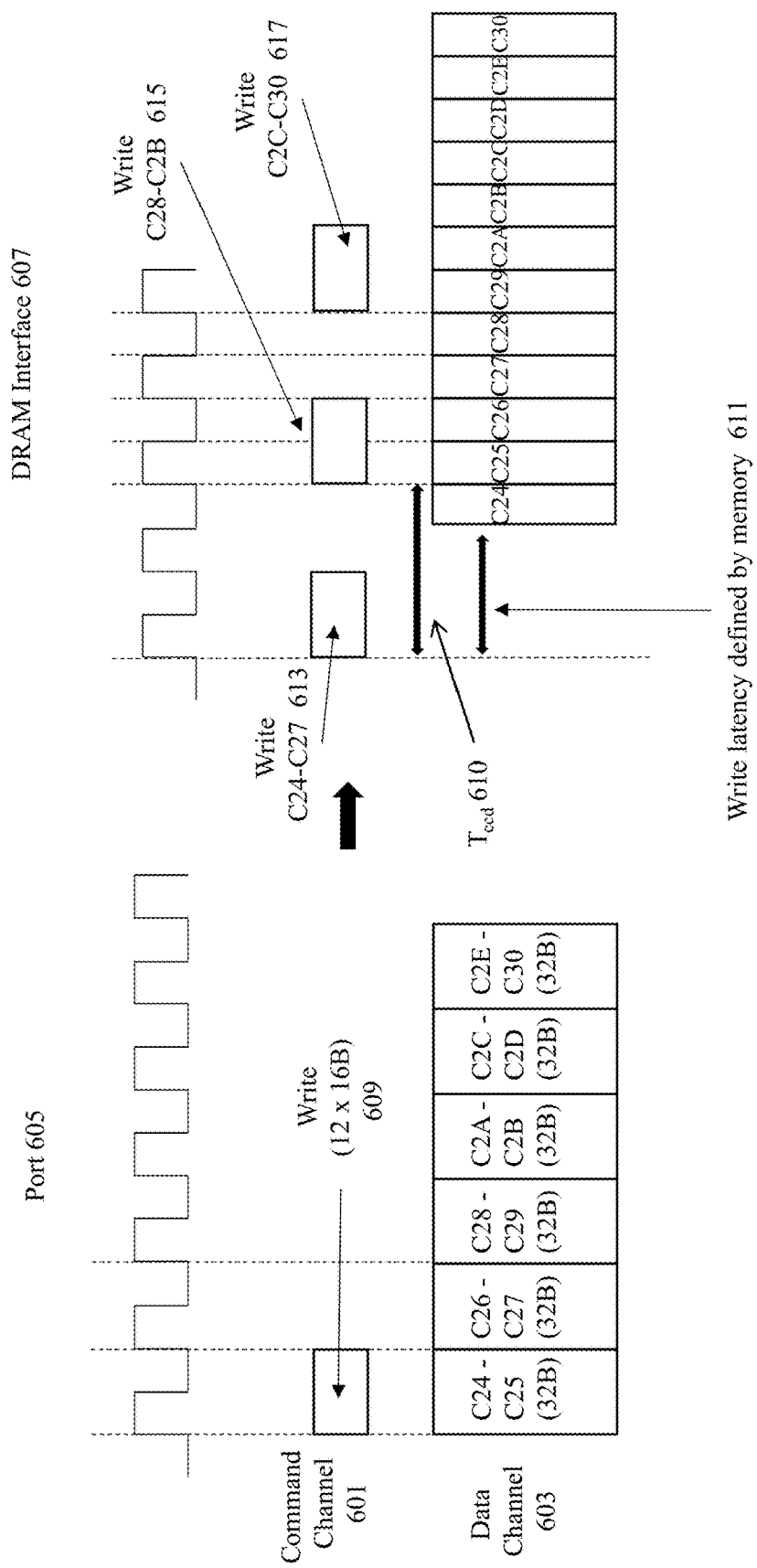
FIG. 7 illustrates an example of transactions in port and split bursts in memory interface according to some embodiments of the invention.

FIG. 7 illustrate the transaction in port and split bursts in memory interface. The Command Channel 601 on the port side 605 shows a write (12×16B) command 609 and the Data Channel 603 shows the memory blocks. On the Command Channel 601 of the DRAM Interface 607, there is a Write C24-27 operation 613 with a write latency defined by memory 611. Typically, the read-to-read or write-to-write access to the same pseudo channel must be issued with an interval of 2 clock cycles. This interval is defined as $T_{CCD}$ 610. As shown in the figure, the HBM memory interface cannot get the most bandwidth because there are idle gaps between each write command (e.g., Write C24-27 613, Write C28-C2b 615, and Write C2C-C30 617.)

FIGS. 8A-8H illustrates an example of a write transaction from host side to legacy mode HBM DRAM interface with the PS bits reversed alternatively. This address mapping method can be re-configured in address management to be compatible for both pseudo channel mode and legacy mode. This address mapping is also shown in FIG. 4.

Figure 8A:
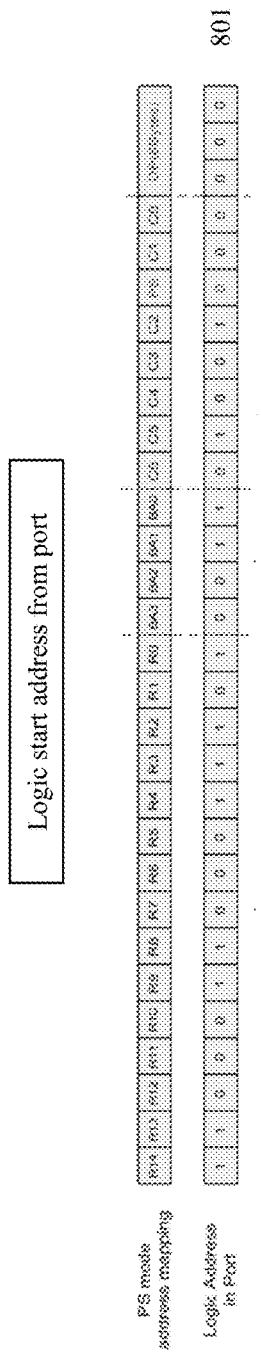
FIGS. 8A-H illustrates an example of a write transaction from host to a legacy mode HBM DRAM with a DRAM burst length of 2 according to some embodiments of the invention.

FIG. 8A illustrates an example of a write transaction in this address mapping. The write transaction from the AMBDA bus has a start binary address of 11-0001-1000-1110-1001-1010-0100-0000 801 and access length of 12×16 bytes. With each BL4 address increase of column address, the PS bit will be reversed alternatively in the address mapping.

Figure 8B:
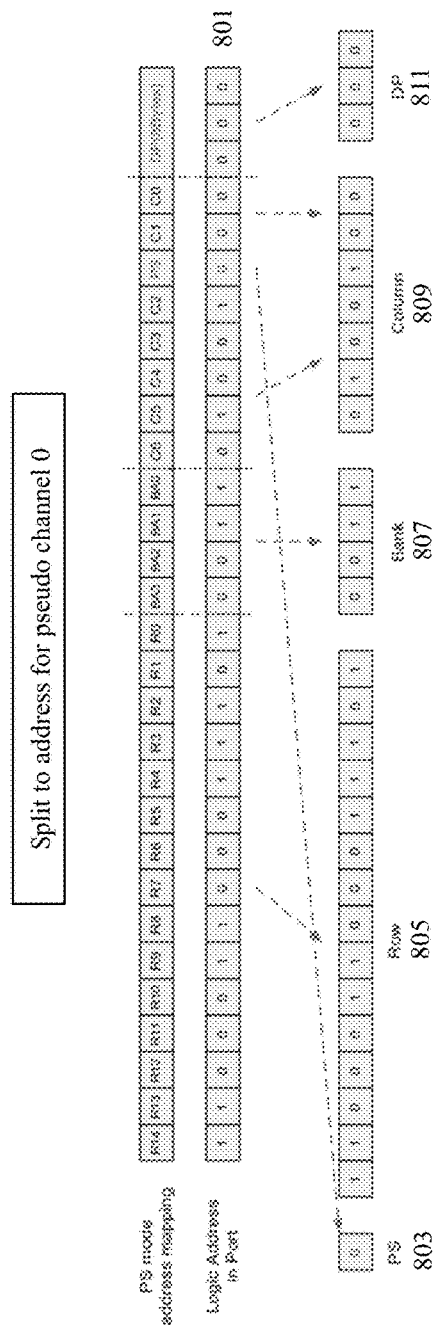

FIG. 8B illustrates a split to address for pseudo channel 0. The address order in module address management is row-bank-column-data bytes. The logic address will be split to (0) pseudo channel 803, (11-0001-1000-1110-1) row 805, (0011) bank 807, (010-0100) column 809, and (000) data bytes 811 with 4 bits for each column data path (DP) 811, 7 bits for column 809, 4 bits for bank 807, and 15 bits for row 805. Thus, the DRAM physical start address will be bank 0x3, row 0x631D, column 0x24, and 0x0 data bytes.

Figure 8C:
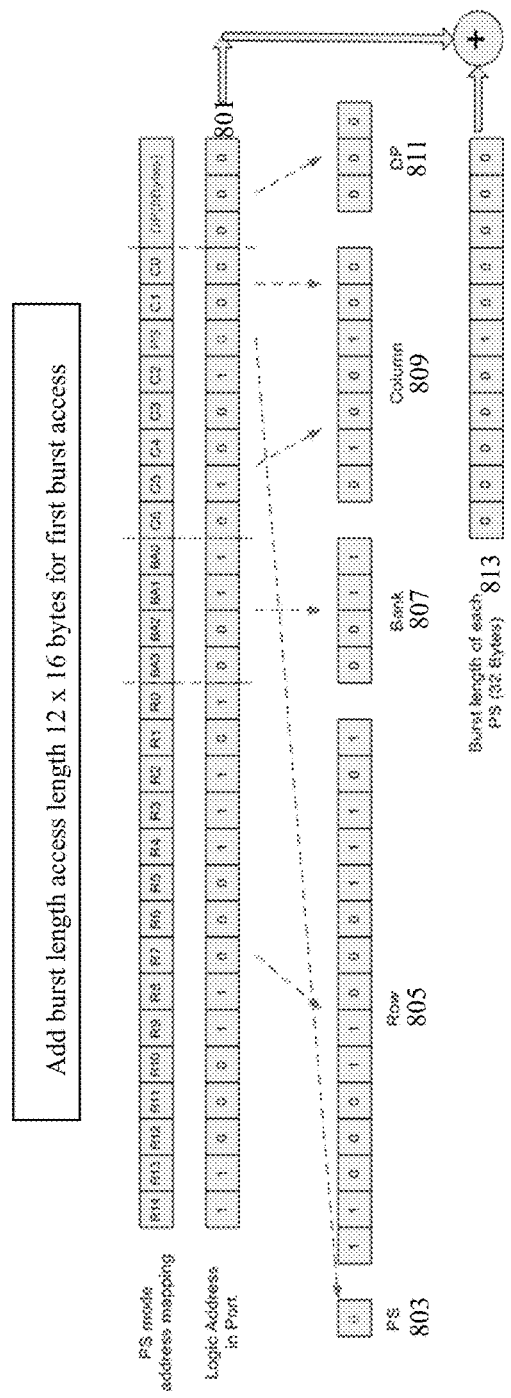

FIG. 8C illustrates adding a first access length of 12x16 bytes. The access length is 12x16 bytes 811 so the access end physical address should be the same bank 0x3, the same row 0x631D, the column is 0x24+12=0x30, and the same data bytes.

Figure 8D:
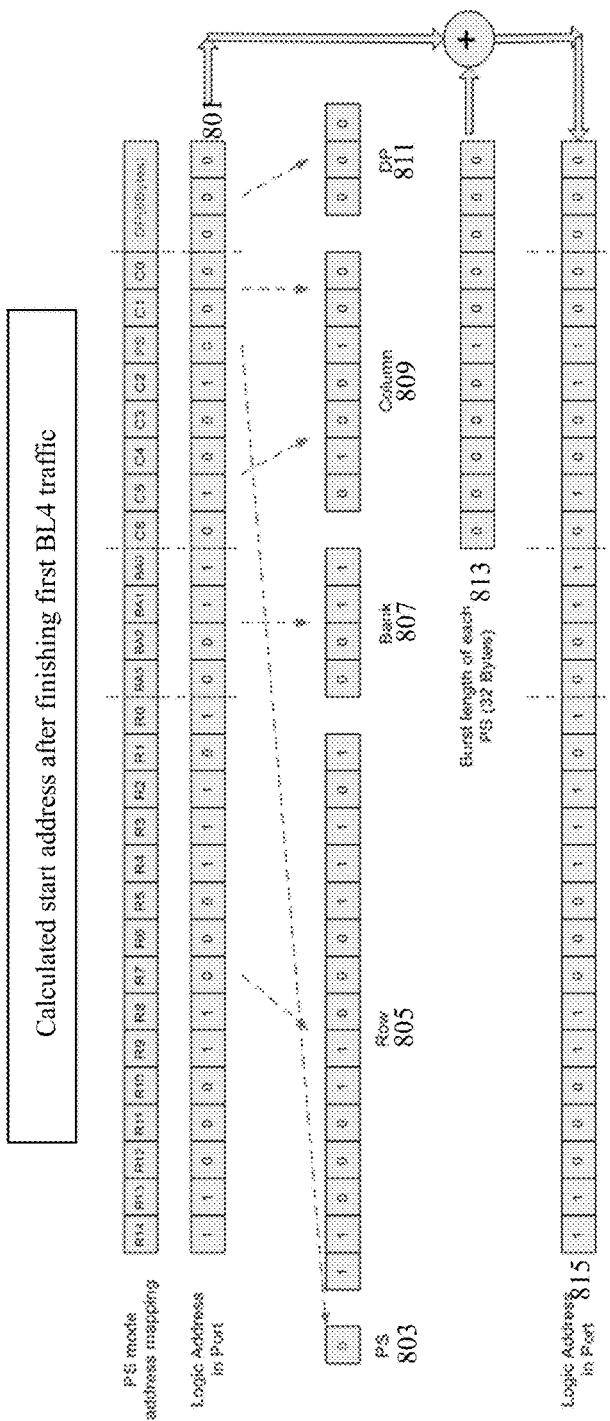

FIG. 8D illustrates the calculated start address after finishing the first BL4 traffic. The burst length of each PS (32 bytes) 813 is added to the split address logic of PS0 to receive the logic address in port 815.

Figure 8E:
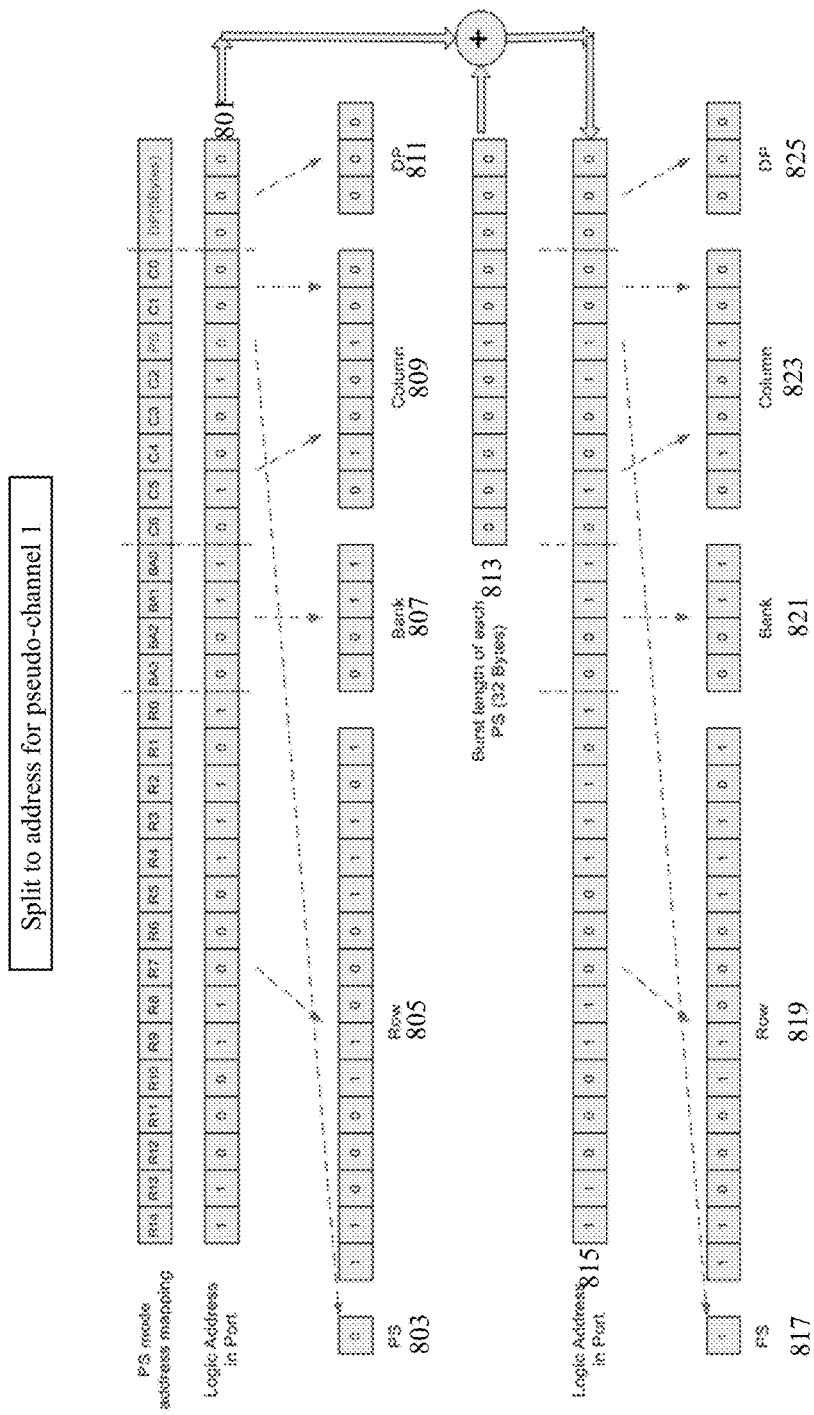

FIG. 8E illustrates the split to address for pseudo-channel 1. The logic address will be split to (1) physical address 817, (11-0001-1000-1110-1) row, 819 (0011) bank 821, (010-0100) column 823, and (000) data bytes with 4 bits for each column data path (DP) 825, 7 bits for column 823, 4 bits for bank 821, and 15 bits for row 819. Thus, the DRAM physical start address for PS1 will be bank 0x3, row 0x631D, column 0x24, and 0x0 data bytes.

Figure 8F:
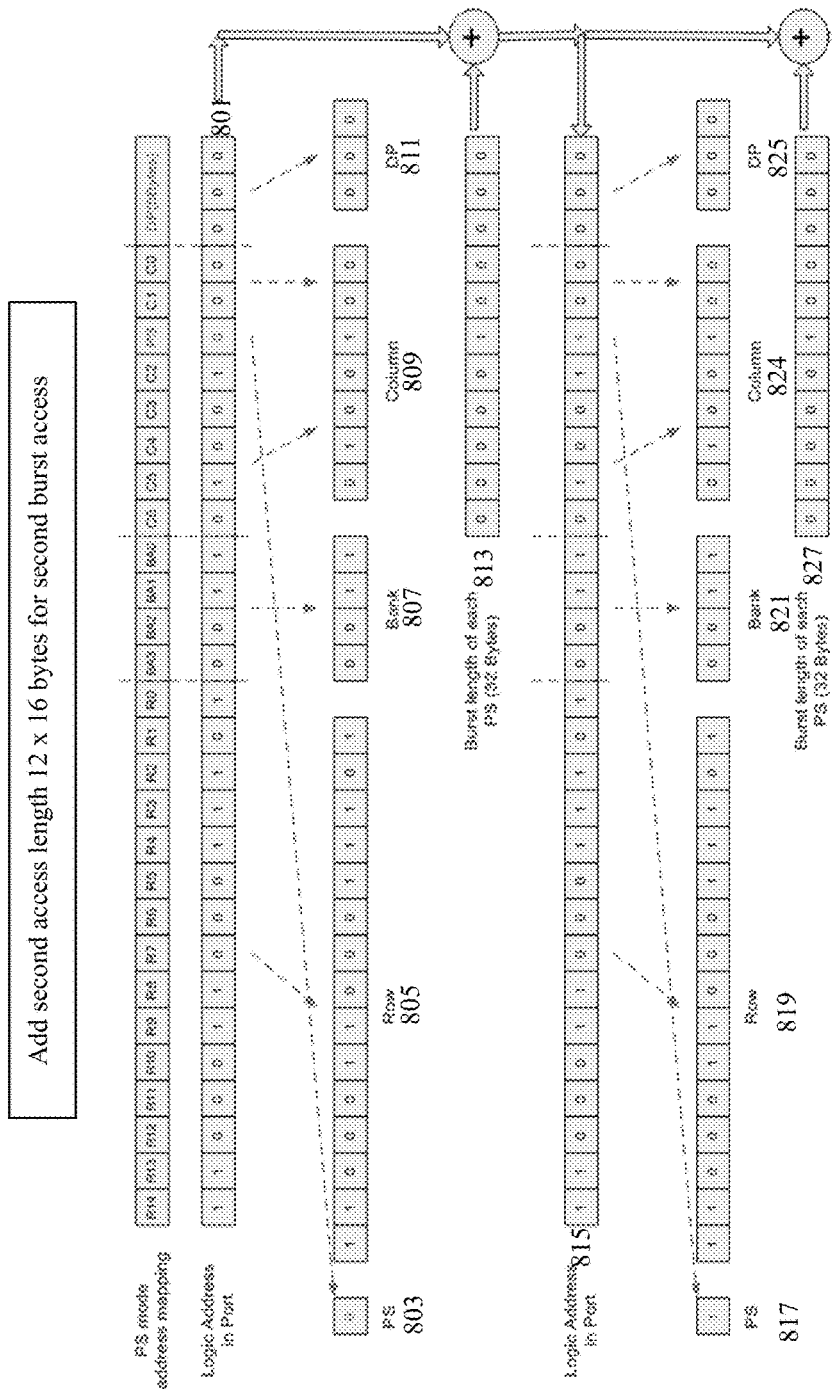

FIG. 8F illustrates adding a second access length of 12x16 bytes for the second burst access. The second access length is 12x16 bytes 827 so the access end physical address should be the same bank 0x3, the same row 0x631D, the column is 0x24+12=0x30, and the same data bytes.

Figure 8G:
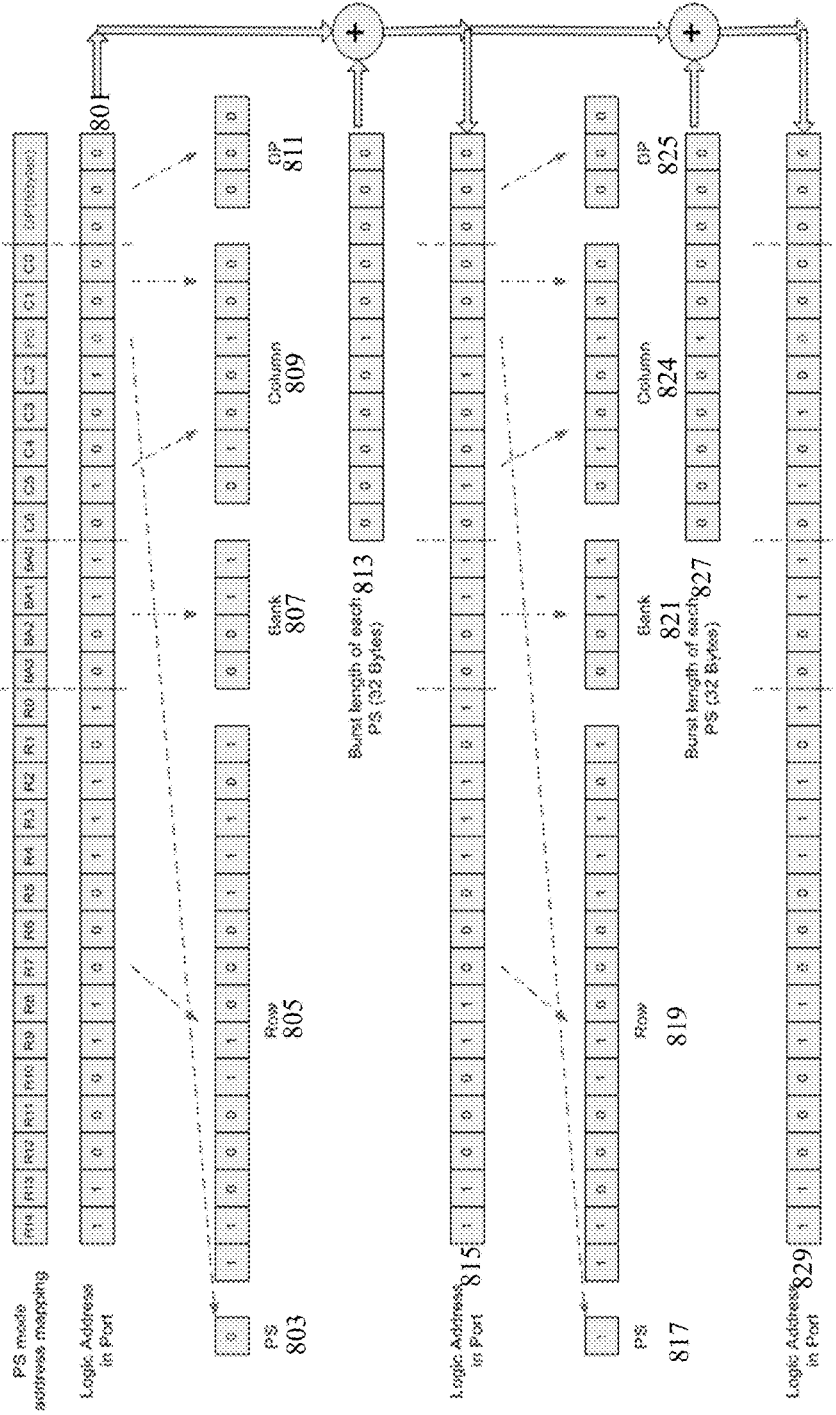

FIG. 8G illustrates Calculated new start address after finishing the second BL4 traffic. The burst length of each PS (32 bytes) 827 is added to the split address logic of PS1 to receive the logic address in port 829.

Figure 8H:
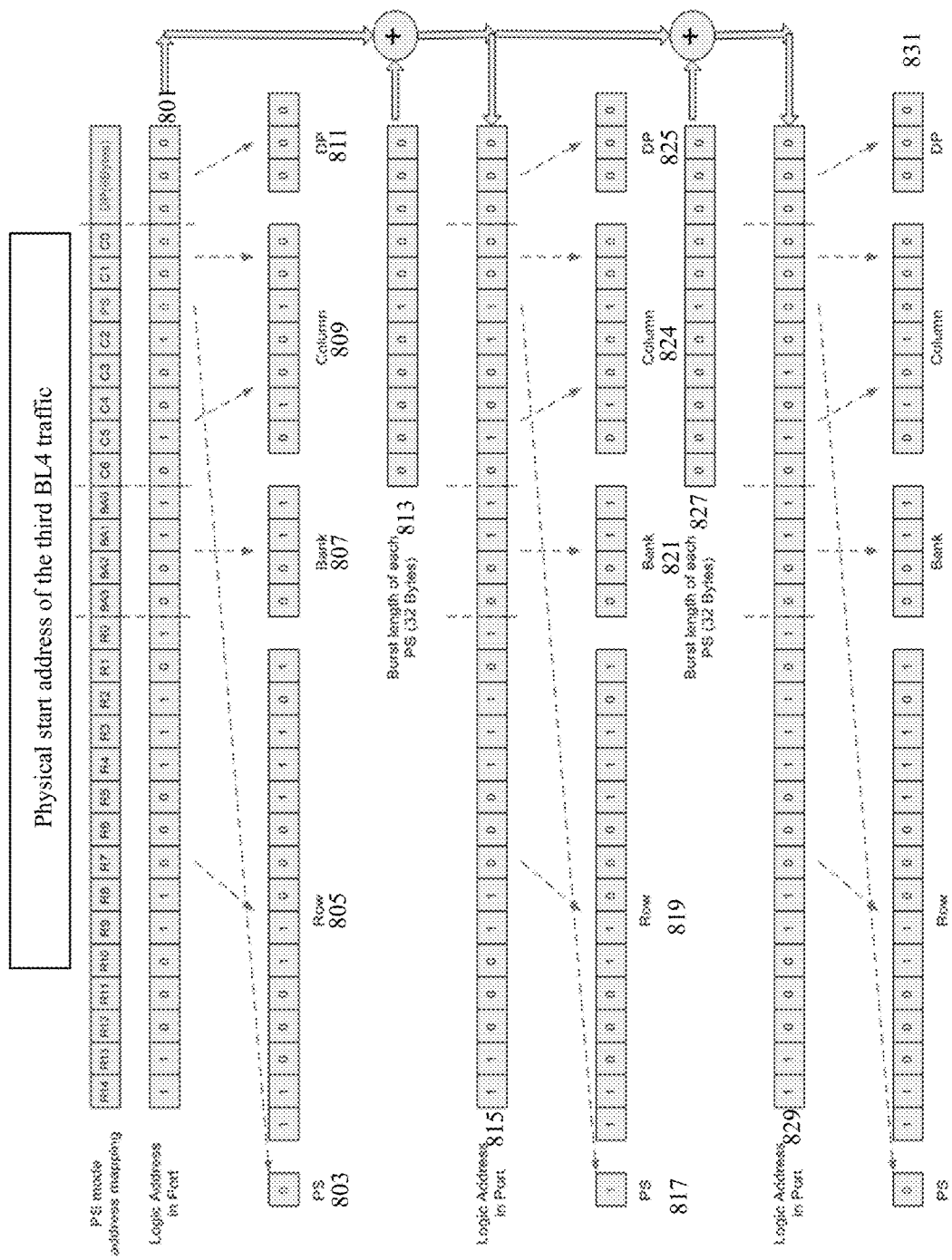

FIG. 8H illustrates the physical start address of the third BL4 traffic in controller. The logic address in port 829 is split internally to the physical address in controller 831.

Figure 9:
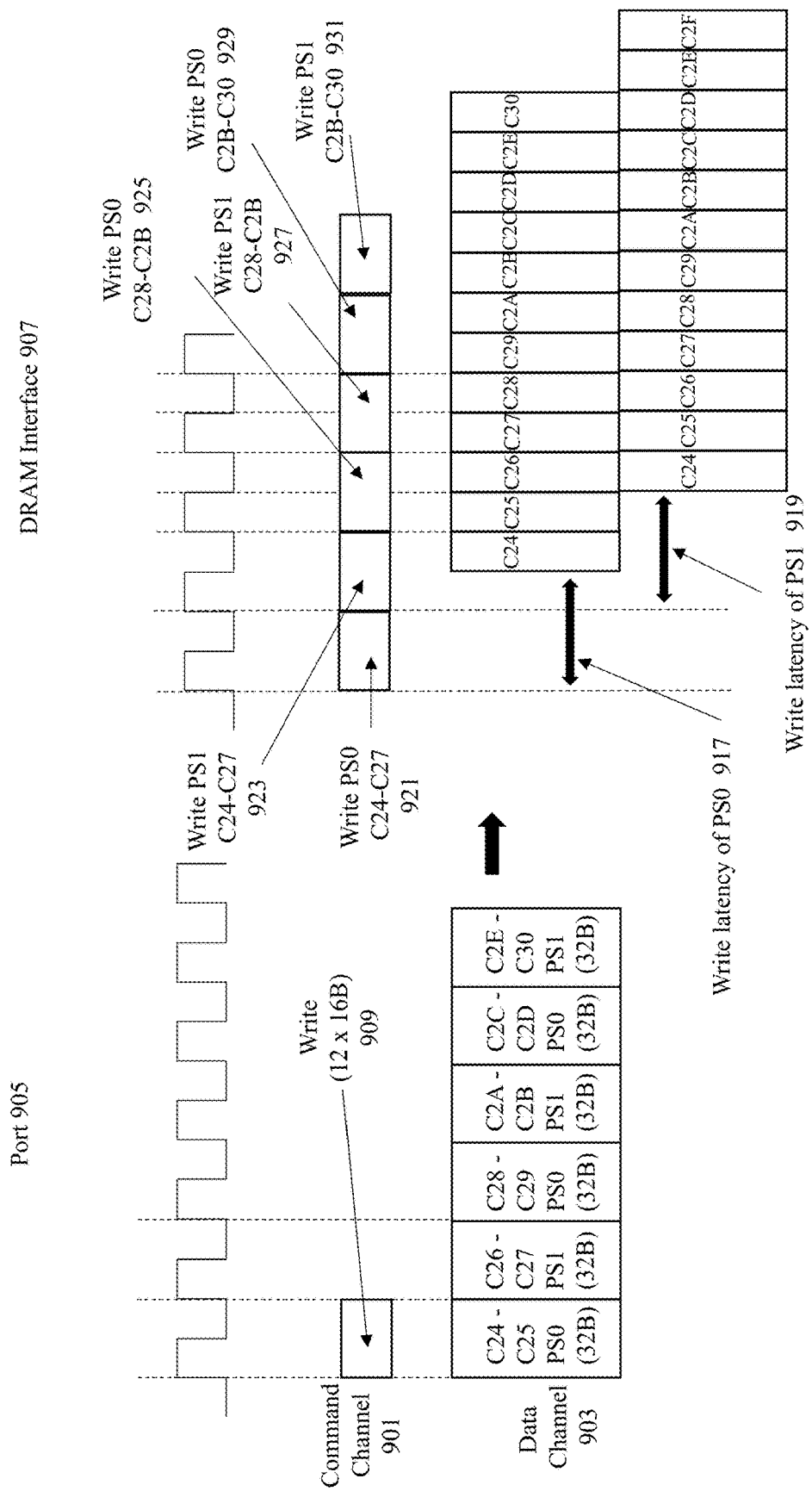
FIG. 9 illustrates an example of transactions in port and split bursts in memory interface with a DRAM burst length of 2 according to embodiments of the invention.

FIG. 9 illustrates the transactions in port and split bursts in memory interface. This address mapping forces each port transaction to alternatively split to two pseudo channels to maximize the utilization of HBM bandwidth.

As shown in FIG. 9, the two ports should be accessed synchronously or with the same access length to acquire the best system performance. The Command Channel 901 on the port side 605 shows a write (12×16B) command 909 and the Data Channel 903 shows the memory blocks. The command access to PS1 can seamlessly follow the command to PS0, but the command access to the same pseudo channel must be issued with a time interval (e.g., write latency of PS0 917 and write latency of PS1 919) on the DRAM Interface 907. Typically, the read to read, or write to write (e.g., write (12×16b) 909) accessing the same pseudo channel must be issued with an interval of 2 clock cycles. However, the read/write from one pseudo channel to the other pseudo channel can be issued seamlessly (e.g., see Write PS0 C24-27 921, Write PS1 C24-C27 923, Write PS0 C28-C2B 925, Write PS1 C28-C2B 927, Write PS0 C2B-C30 929, Write PS1 C2B-C30 931). Therefore, to acquire the most bandwidth on the pseudo channel mode HBM, the two pseudo channels should be accessed alternatively (e.g, see Data Channel 903 on Port 905).

System Architecture Overview

Figure 10:
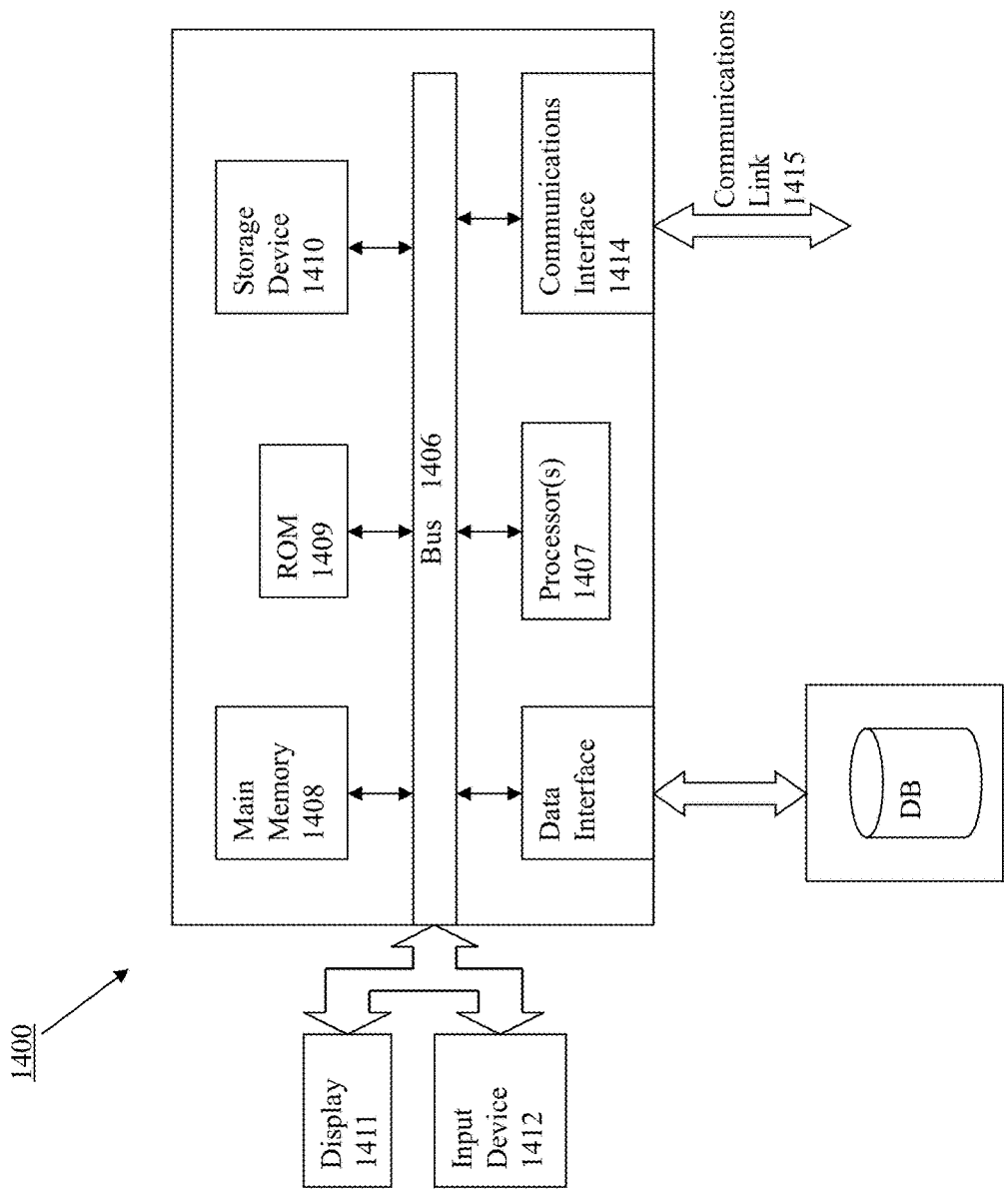
FIG. 10 depicts a block diagram of an instance of a computer system suitable for implementing an embodiment of the present disclosure.

FIG. 10 is a block diagram of an illustrative computing system suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for supporting pseudo channel mode (PS) or legacy mode on high bandwidth memory (HBM), comprising:
    selecting a legacy mode operation;
    using a single command channel to accept read transactions or write transactions in a single port for the legacy mode operation or a pseudo channel mode operation;
    re-arranging a schedule of at least some of the read transactions or the write transactions;
    converting the read transactions or write transactions to DRAM bursts;
    sending DRAM burst commands to implement the DRAM bursts, wherein the DRAM bursts are implemented to initiate DRAM burst reads or DRAM burst writes to a memory interface; and
    executing the DRAM burst commands to read data from a memory or write data to the memory by alternatively splitting each read transaction access or write transaction access to two pseudo channels.

2. The method of claim 1, wherein accepting a read transaction or write transaction comprises using both a single command channel and single data channel.

3. The method of claim 1, wherein re-arranging the schedule comprises using a pseudo channel rotation.

4. The method of claim 1, wherein re-arranging the schedule further comprises re-configuring an address mapping method in a re-configuration interface.

5. The method of claim 1, wherein accepting a read or write transaction further comprises implementing a single architecture to support both pseudo channel mode and legacy mode.

6. The method of claim 3, further comprising a host that does not need to indicate a pseudo channel address to HBM controller.

7. The method of claim 1, further comprising supporting pseudo channel mode without a pseudo channel command arbitrator.

8. The method of claim 3, further comprising splitting each port data to access two pseudo channels.

9. The method of claim 1, wherein a port data width is twice a memory data width when a port frequency comprises a one to one ratio with a memory frequency; and if the port frequency comprises a one to two ratio with the memory frequency, then the port data width is four times the memory data width.

10. The method of claim 1, wherein an address mapping method comprises at least a row, bank, column, pseudo channel, or a bit width in each column unit.

11. A system for supporting pseudo channel mode (PS) or legacy mode on high bandwidth memory (HBM), comprising:
    a processor;
    a memory for holding programmable code; and
    wherein the programmable code includes instructions for selecting a legacy mode operation, using a single command channel to accept read transactions or write transactions in a single port for the legacy mode operation or a pseudo channel mode operation, re-arranging a schedule of at least some of the read transactions or the write transactions, converting the read transactions or write transactions to DRAM bursts, sending DRAM burst commands to implement the DRAM bursts, wherein the DRAM bursts are implemented to initiate DRAM burst reads or DRAM burst writes to a memory interface, and executing the DRAM burst commands to read data from a memory or write data to the memory by alternatively splitting each read transaction access or write transaction access to two pseudo channels.

12. The system of claim 11, wherein accepting a read transaction or write transaction comprises using both a single command channel and single data channel.

13. The system of claim 11, wherein re-arranging the schedule comprises using a pseudo channel rotation.

14. The system of claim 11, wherein re-arranging the schedule further comprises re-configuring an address mapping method in a re-configuration interface.

15. The system of claim 11, wherein accepting a read or write transaction further comprises implementing a single architecture to support both pseudo channel mode and legacy mode.

16. The system of claim 13, further comprising a host that does not need to indicate a pseudo channel address to HBM controller.

17. The system of claim 11, further comprising supporting pseudo channel mode without a pseudo channel command arbitrator.

18. The system of claim 13, further comprising splitting each port data to access two pseudo channels.

19. The system of claim 11, wherein a port data width is twice a memory data width when a port frequency comprises a one to one ratio with a memory frequency; and if the port frequency comprises a one to two ratio with the memory frequency, then the port data width is four times the memory data width.

20. The system of claim 11, wherein an address mapping method comprises at least a row, bank, column, pseudo channel, or a bit width in each column unit.

\* \* \* \* \*